(12) United States Patent
Harjani et al.

(10) Patent No.: US 9,374,111 B2
(45) Date of Patent: Jun. 21, 2016

(54) MULTI-STAGE CHARGE RE-USE ANALOG CIRCUITS

(71) Applicant: Regents of the University of Minnesota, St. Paul, MN (US)

(72) Inventors: Ramesh Harjani, Minneapolis, MN (US); Bodhisatwa Sadhu, Minneapolis, MN (US); Martin D. Sturm, Minneapolis, MN (US); Sachin Kalia, Minneapolis, MN (US); Satwik Patnaik, Portland, OR (US)

(73) Assignee: Regents of the University of Minnesota, Minneapolis, MN (US)

( * ) Notice: Subject to any disclaimer, the term of this patent is extended or adjusted under 35 U.S.C. 154(b) by 421 days.

(21) Appl. No.: 13/859,476

(22) Filed: Apr. 9, 2013

(65) Prior Publication Data

US 2014/0079098 A1   Mar. 20, 2014

Related U.S. Application Data

(60) Provisional application No. 61/658,689, filed on Jun. 12, 2012, provisional application No. 61/621,923, filed on Apr. 9, 2012.

(51) Int. Cl.
*G06G 7/02* (2006.01)
*H04B 1/00* (2006.01)
(Continued)

(52) U.S. Cl.
CPC .............. *H04B 1/001* (2013.01); *H04B 7/0837* (2013.01); *H04B 7/086* (2013.01); *H04L 27/0006* (2013.01)

(58) Field of Classification Search
None
See application file for complete search history.

(56) References Cited

U.S. PATENT DOCUMENTS

| 8,604,861 | B1 * | 12/2013 | Ceballos | G06G 7/18 |
| | | | | 327/337 |
| 8,849,886 | B2 * | 9/2014 | Cook | H03H 15/023 |
| | | | | 708/819 |

(Continued)

OTHER PUBLICATIONS

Sadhu et al., "Energy Efficient Circuit Architectures for Spectrum Sensing in Cognitive Radios," MARCO Focus Center for Circuit & System Solution (C2S2), 2008 Annual Review, 1 pp. (Note: Applicant points out in accordance with MPEP 609.04(a) that the 2008 year of publication is sufficiently earlier than the effective U.S. filing date and any foreign priority date of Apr. 9, 2013 so that the particular month of publication is not in issue.).

(Continued)

*Primary Examiner* — Tan V. Mai
(74) *Attorney, Agent, or Firm* — Shumaker & Sieffert, P.A.

(57) ABSTRACT

A linear transform can be performed using a passive analog multi-stage charge re-use linear transform circuit. The passive analog multi-stage charge re-use linear transform circuit transforms an input analog circuit to generate a transformed analog output signal. The passive analog multi-stage charge re-use linear transform circuit may be included in a software defined radio (SDR), where the transformed analog output signal may be output to an analog-to-digital converter (ADC) of the SDR device so as to enable the ADC to perform wideband spectrum sensing. The passive analog multi-stage charge re-use linear transform circuit may also be included in a beamforming device so as to enable the device to perform spectral shifting and spatial shifting of signals. This passive analog multi-stage charge re-use linear transform circuit may promote reduced power consumption in comparison to other circuits while also supporting wideband applications at high sampling rates.

25 Claims, 32 Drawing Sheets

(51) Int. Cl.
*H04L 27/00* (2006.01)
*H04B 7/08* (2006.01)

(56) References Cited

U.S. PATENT DOCUMENTS

2008/0007326 A1* 1/2008 Iida .................... H03H 19/004
327/554

2008/0218396 A1* 9/2008 Anthony ............. H03M 1/1245
341/161

OTHER PUBLICATIONS

Office Action from U.S. Appl. No. 14/219,202, dated Apr. 11, 2016, 6 pages.

* cited by examiner

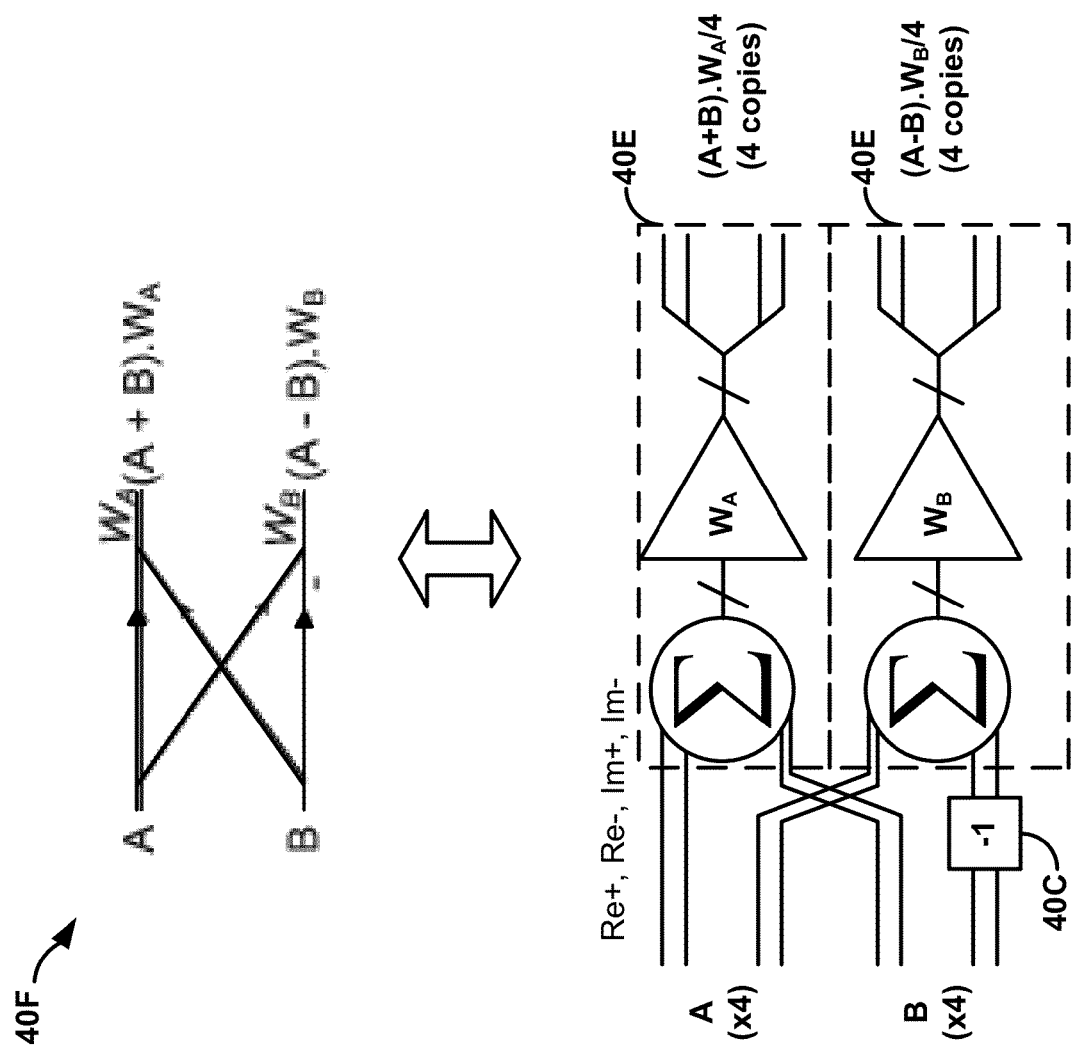

| Ref | Domain | # of bins | SNDR (dB) | Power (mW) | Samp. speed (GS/s) | Scaled* E/conv. (pJ/conv.) | E/conv. ratio |
|---|---|---|---|---|---|---|---|
| [6] | Current | 64 | — | 389 | 1.2 | 345.8 | 28X |
| [7] | Current | 8 | 36 | 19 | 1 | 405.3 | 33X |
| [9] | Digital | 128 | 51† | 175 | 1 | 1600 | 131X |
| This work | Charge | 16 | 47‡ | 0.92 | 5 | 12.2 | 1X |

*Scaled for complexity similar to the scaling used in [7]
†8.5bit ENOB assumed for 10bit internal word length
‡After twiddle factor correction

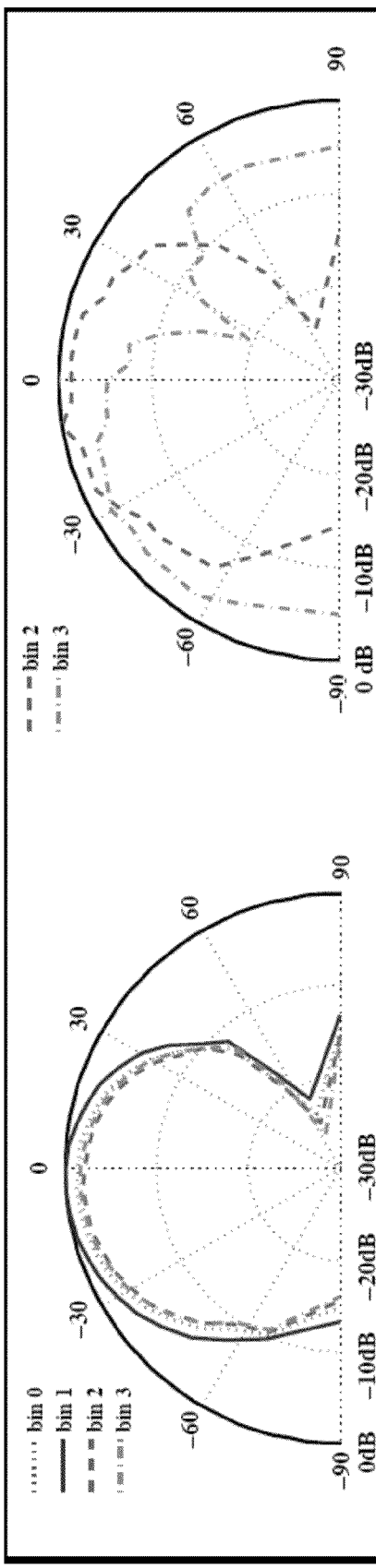
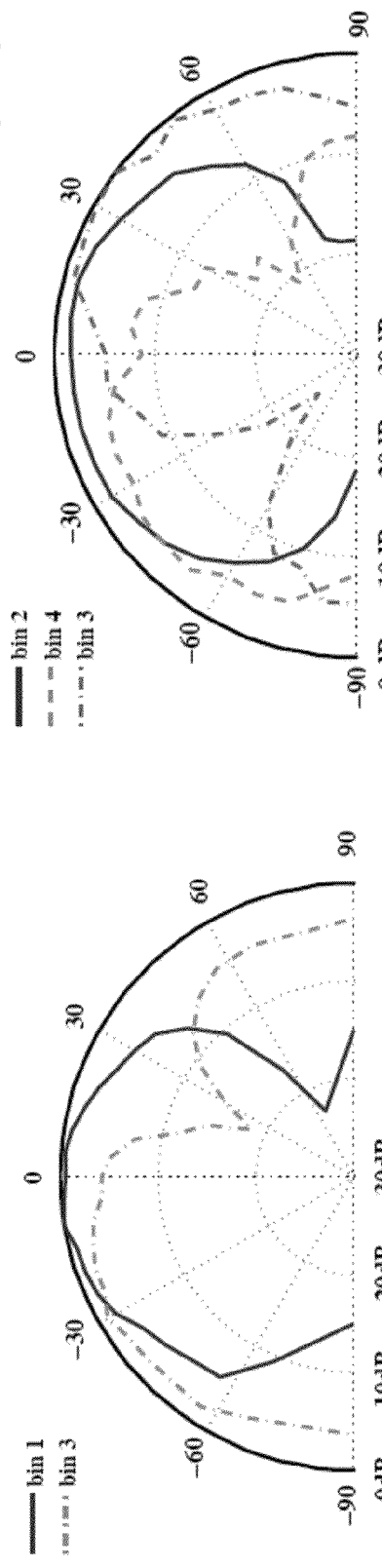
FIG. 29A (a) Broadside beamforming on each bin (4 overlaid measurements)
FIG. 29B (b) Simultaneous beamforming on 2 adjacent frequency bins in independently steered directions
FIG. 29C (c) Simultaneous beamforming on 2 non-adjacent frequency bins in independently steered directions
FIG. 29D (d) Simultaneous beamforming on 3 frequency bins in 3 independently steered directions

MULTI-STAGE CHARGE RE-USE ANALOG CIRCUITS

This application claims the benefit of U.S. Provisional Application No. 61/621,923, filed Apr. 9, 2012, the entire contents of which are incorporated herein by reference.

This application also claims the benefit of U.S. Provisional Patent No. 61/658,689, filed Jun. 12, 2012, the entire contents of which are incorporated herein by reference.

GOVERNMENT RIGHTS

This invention was made with government support under W911NF-09-1-0562 and W911NF-10-1-0141 awarded by the Army, N66001-11-1-4158 awarded by the Space and Naval Warfare Systems Command (SPAWAR), and HR0011-10-3-0002 awarded by the Defense Advanced Research Projects Agency (DARPA). The government has certain rights in the invention.

TECHNICAL FIELD

This disclosure relates to analog circuits.

BACKGROUND

Software defined radios (SDR) strive to digitize radio frequency (RF) signals and perform spectrum sensing in the digital domain. SDRs perform this spectrum sensing to determine where available or unused spectrum and unavailable or used spectrum resides in order to provide spectrum for use in communicating an RF signal. However, attempting to perform spectrum sensing for wideband inputs often translates to impractical or potentially infeasible analog-to-digital converters (ADC) specifications.

As a result of these impractical ADC specifications, a number of techniques, including time interleaving and N-path filter-banks have been proposed to address the wideband channelization problem. However, while time interleaving ADCs may reduce ADC speed, the input dynamic range (exponentially related to ADC power) may remain large. Filter-banks may reduce both the speed and dynamic range (by removing out-of-band signals) of ADCs. However, filter-banks are commonly based on phased-locked loops (PLLs), which are a type of control system that generates an output signal whose phase is related to the phase of an input "reference" signal, mixers and low-pass filters, each of which may consume considerable amounts of power. Additionally, signal reconstruction from the digitized filter-bank outputs may be challenging.

In addition, spatial diversity to achieve signal directivity and filtering can be achieved using phased arrays. Such techniques can be applied to a variety of applications to improve communication robustness and performance. Applications may include use by the military to send and receive information from fixed directions and to filter out enemy blockers. Other applications may include usage in automotive and vehicular radios, satellite communications, imaging applications, home audio/visual applications, and the like.

In addition, it may also be possible to use additional diversity to improve communication robustness and performance. For example, in addition to using spatial diversity for precise targeting, radar systems may also use frequency diversity to reduce target fluctuations. Furthermore, diversity in space and time may also be used to send and receive codes occupying the same frequency bandwidth. With each degree of diversity an additional degree of freedom may be gained to manipulate and immunize signals of interest.

SUMMARY

In general, this disclosure describes techniques related to the design of charge re-use analog Fourier transform (CRAFT) systems and methods. In some examples, the CRAFT system may refer to a radio frequency (RF) front-end channelizer for software defined radios (SDRs), where the channelizer may be based on a 16-point analog domain fast Fourier transform (FFT). The design relies on charge re-use to potentially achieve approximately 47 decibels (dB) average output signal-to-noise and distortion ratio (SNDR) on a 5 giga-samples per second (GS/s) input, and may consume only 12.2 pico Joules (pJ) per conversion (pJ/conv), which may represent orders of magnitude of improvement over conventional designs of SDR front-ends. As a result of the potentially large instantaneous input bandwidth, high linearity, and low power channelization capabilities, the CRAFT-based channelizer may significantly reduce the sample rate and dynamic range requirements for wide-band digitization in SDRs, as one example. Additionally, while described with respect to a particular type of application, i.e., SDR in this example, these techniques may be extended to improve the performance of other passive switched capacitor designs used in other applications.

In some other examples, the CRAFT system may refer to a frequency discriminator for intermediate frequency (IF) spatio-spectral beamforming front-ends in an RF spatio-spectral beamformer that filters RF signals in spectrum and space. For a two-channel, four-frequency phased array beamformer, the frequency discriminator may be based on a 4-point analog domain FFT that is capable of multiple and simultaneous beamsteering directions per frequency bin. For the 4-point FFT, the CRAFT-based frequency discriminator may take in four sampled time domain inputs and output four discrete frequency domain values. The CRAFT-based frequency splitter may consume negligible power and may lend itself well to scaling. Further, because of the size of the frequency slice is directly proportional to the sampling rate of the FFT, the CRAFT-based frequency splitter may be tunable across a wide range. Additionally, while described with respect to a particular type of application, i.e., an RF spatio-spectral beamformer in this example, these techniques may be extended to improve the performance of other passive switched capacitor designs used in other applications.

In one aspect, a method may include receiving, by a passive analog circuit, an analog input signal. The method may further include processing, by the passive analog circuit, the analog input signal in a charge domain to generate an analog output signal. The method may further include outputting, by the passive analog circuit, the analog output signal in the charge domain.

In another aspect, a device may include a plurality of capacitors. The device may further include a plurality of gates operably coupled to the plurality of capacitors, wherein the plurality of capacitors and the plurality of gates are configured to perform one or more operations in a charge domain to process an analog input signal to generate an analog output signal.

In another aspect, a device may include means for receiving an analog input signal. The device may further include means for processing the analog input signal in a charge domain to generate an analog output signal. The device may further include means for outputting the analog output signal in the charge domain.

In another aspect, a device may include an analog linear transform circuit configured to transform an analog input signal with an analog linear transform circuit to generate a transformed analog signal, and further configured to output the transformed analog signal to one or more analog-to-digital converters (ADC) units. The device may further include the one or more ADC units operably coupled to the passive analog circuit and configured to convert the transformed analog signal to one or more digital signals.

In another aspect, a method may include transforming an analog input signal with an analog linear transform circuit to generate a transformed analog signal. The method may further include outputting the transformed analog signal with the analog linear transform circuit to one or more analog-to-digital converter (ADC) units.

In another aspect, a device may include means for transforming an analog input signal to generate a transformed analog signal. The device may further include means for outputting the transformed analog signal with the analog linear transform circuit.

In another aspect a beamforming device may include one or more antennas configured to receive one or more radio frequency (RF) signals. The beamforming device may further include one or more RF mixers operably coupled to the one or more antennas and configured to translate the one or more RF signals to one or more intermediate frequency (IF) signals. The beamforming device may further include one or more passive analog circuits operably coupled to the one or more RF mixers and configured to perform one or more spectral filtering operations in a charge domain on the one or more IF signal to output a plurality of frequency slices. The beamforming device may further include one or more vector combiners operably coupled to the one or more passive analog circuits and configured to perform one or more spatial filtering operations in the charge domain on the plurality of frequency slices to output a spatial-spectral filtered analog signal. The beamforming device may further include one or more analog-to-digital converter (ADC) units operably coupled to the one or more vector combiners and configured to convert the spatial-spectral filtered analog signal to one or more digital signals In another aspect, a method may include receiving, by one or more antennas, one or more radio frequency (RF) signals. The method may further include translating, by one or more RF mixers, the one or more RF signals to one or more intermediate frequency (IF) signals. The method may further include performing, by one or more passive analog circuits, one or more spectral filtering operations in a charge domain on the one or more IF signal to output a plurality of frequency slices. The method may further include performing, by one or more vector combiners, one or more spatial filtering operations in the charge domain on the plurality of frequency slices to output a spatial-spectral filtered analog signal. The method may further include converting, by one or more analog-to-digital converter (ADC) units, the spatial-spectral filtered analog signal to one or more digital signals.

In another aspect, a device may include means for receiving one or more radio frequency (RF) signals. The device may further include means for translating the one or more RF signals to one or more intermediate frequency (IF) signals. The device may further include means for performing one or more spectral filtering operations in a charge domain on the one or more IF signal to output a plurality of frequency slices. The device may further include means for performing one or more spatial filtering operations in the charge domain on the plurality of frequency slices to output a spatial-spectral filtered analog signal. The device may further include means for converting the spatial-spectral filtered analog signal to one or more digital signals.

The details of one or more examples are set forth in the accompanying drawings and the description below. Other features, objects, and advantages will be apparent from the description and drawings, and from the claims.

BRIEF DESCRIPTION OF THE DRAWINGS

FIGS. 3A-3F are diagrams each illustrating construction of different charge re-use operation or function in accordance with the techniques described in this disclosure and a corresponding symbol representative of these operations.

FIGS. 29A-29D are diagrams illustrating output patterns of beamforming tests according to some aspects of the present disclosure.

DETAILED DESCRIPTION

Software Defined Radios

Figure 1:
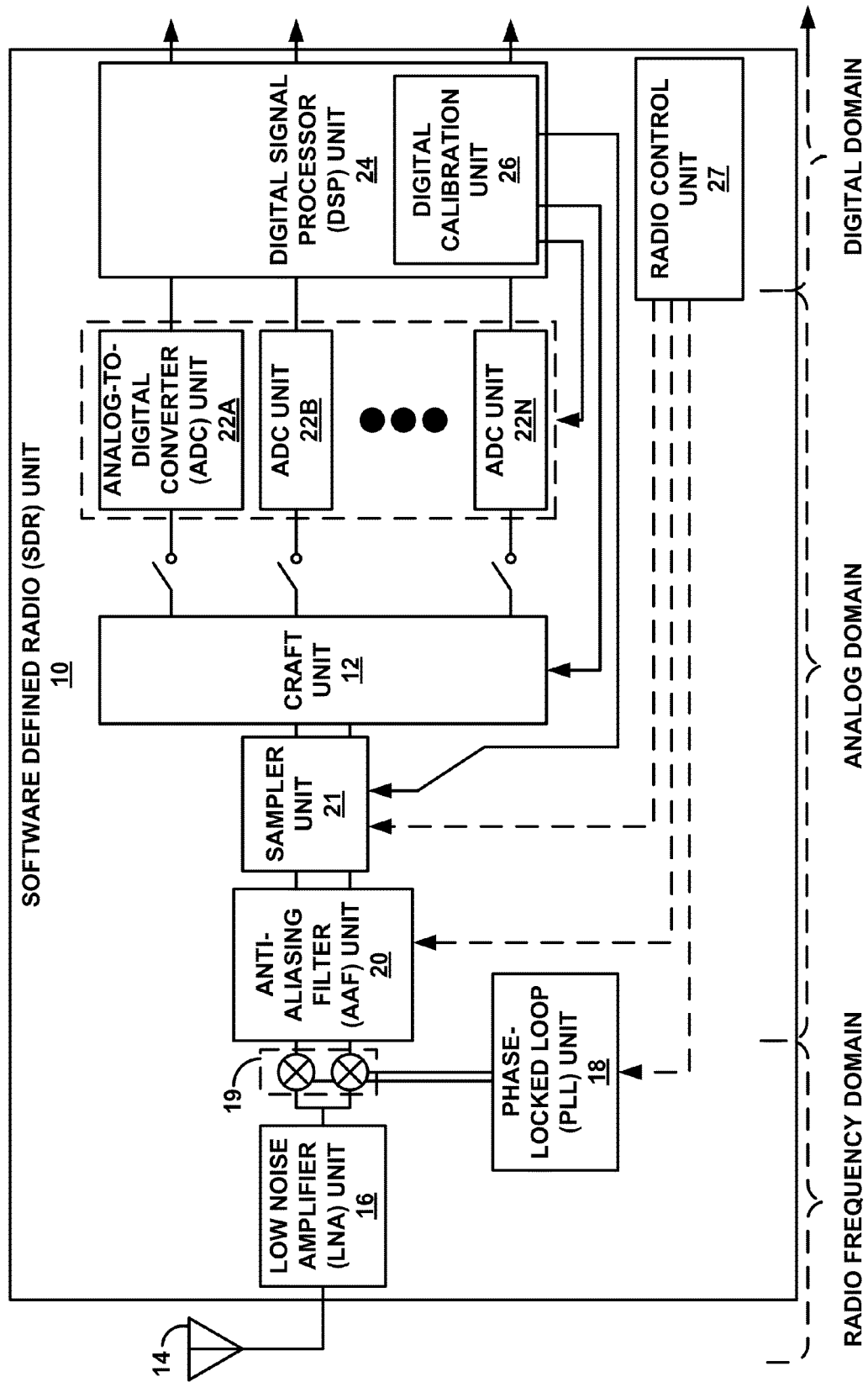
FIG. 1 is a block diagram illustrating a software defined radio (SDR) unit that includes a charge re-use analog Fourier transform (CRAFT) radio frequency (RF) front-end unit that performs the techniques described in this disclosure.

Software defined radios (SDR) strive to digitize radio frequency (RF) signals and perform spectrum sensing in the digital domain. SDRs perform this spectrum sensing to determine where available or unused spectrum and unavailable or used spectrum resides in order to provide spectrum for use in communicating an RF signal. However, attempting to perform spectrum sensing for wideband inputs often translates to impractical or potentially infeasible analog-to-digital converters (ADC) specifications.

As a result of these impractical ADC specifications, a number of techniques, including time interleaving and N-path filter-banks have been proposed to address the wideband channelization problem. However, while time interleaving ADCs may reduce ADC speed, the input dynamic range (exponentially related to ADC power) may remain large. Filter-banks may reduce both the speed and dynamic range (by removing out-of-band signals) of ADCs. However, filter-banks are commonly based on phased-locked loops (PLLs), which are a type of control system that generates an output signal whose phase is related to the phase of an input "reference" signal, mixers and low-pass filters, each of which may consume considerable amounts of power. Additionally, signal reconstruction from the digitized filter-bank outputs may be challenging.

In accordance with the techniques described in this disclosure, the CRAFT system may use a discrete Fourier transform (DFT) as a functionally equivalent linear phase N-path filter to perform channelization. These techniques may reduce both the speed and dynamic range of the ADCs, and, by virtue of being minimal phase, may allow for simple reconstruction in the digital domain. While a few current-based analog DFT filters have been designed recently, these designs are often speed-limited, and may consume significant amounts of power, thereby minimizing the overall gains. Additionally, these designs may use active devices (meaning devices that require power) in the signal processing unit and, therefore, may have a higher non-linearity. In comparison, the CRAFT system that performs the techniques described in this disclosure may utilize a charge domain DFT to reduce, if not potentially eliminate, the power overhead, thereby promoting use of a DFT-based wideband digitizing front-end system.

This disclosure describes the design of such a DFT-based wideband digitizing front end system, referred to as CRAFT (Charge Re-use Analog Fourier Transform), based on passive switched capacitors. This CRAFT system may perform an analog domain 16-point DFT running at input rates as high as 5 giga-samples per second (GS/s), which only consumes approximately 12.2 pico-Joules (pJ) of energy per conversion. The CRAFT RF front-end system may reduce the speeds at which ADCs operate by a factor of N, at a negligible power overhead. The ADC dynamic range may also be reduced due to the removal of out-of-band signals per ADC.

The CRAFT front-end system may bring the required ADC specifications from being nearly infeasible toward being achievable. Also, the total power of multiple ADCs, which precede CRAFT, may be lower than that of a single ADC without CRAFT. By potentially solving this critical broadband digitizing problem, the CRAFT system may, in some examples of this disclosure, enable the realization of wideband SDRs. While described in this disclosure with respect to a particular application, i.e., SDR in this example, the techniques may be implemented with respect to other applications. For example, the techniques described in this disclosure may be implemented in cognitive radios (CRs), video processing, image processing, high-speed ADC, RF filters, multipath filters and polyphase filters.

FIG. 1 is a block diagram illustrating a software defined radio (SDR) unit 10 that includes a charge re-use analog Fourier transform (CRAFT) radio frequency (RF) front-end unit 12 that performs the techniques described in this disclosure. As shown in the example of FIG. 1, SDR unit 10 includes an antenna 14, a low noise amplifier (LNA) unit 16, a phase-locked loop (PLL) unit 18, RF mixer units 19, an anti-aliasing filter (AAF) unit 20, a sampler unit 21, a number of analog-to-digital converter (ADC) units 22A-22N ("ADC units 22"), a digital signal processor (DSP) unit 24 and a radio control unit 27. Reference to units or modules in this disclosure may refer to hardware or a combination of hardware and software. In some instances, each of the units may be implemented as dedicated hardware or a combination of dedicated hardware and software. In other instances, two or more units may be implemented as a combined unit, sharing hardware, which may in some instances also execute software (in the form of instructions). Reference to individual units may therefore refer to functional operations and may not denote the underlying implementation or structure.

Antenna 14 may represent any type of antenna capable of receiving RF signals. LNA unit 16 may represent a unit that is used to amplify possibly weak signals captured or received by antenna 14. PLL unit 18 may represent a control system that generates an output signal whose phase is related to the phase of an input so-called "reference" signal. Typically, PLL unit 18 is implemented as an electronic circuit that includes a variable frequency oscillator and a phase detector. This circuit compares the phase of the input signal with the phase of the signal derived from the output oscillator and adjusts the frequency of the oscillator to keep the phases of the signal output from the oscillator in synch with the phase of the input signal. The signal from the phase detector of PLL unit 18 may be used to control the oscillator in what is commonly referred to as a "feedback loop." RF mixer units 19 may represent units that perform frequency translation from RF to baseband frequency (which may also be referred to as an intermediate frequency (IF)).

AAF unit 20 may represent a filter that may be varied or configured to restrict bandwidth of a signal. AAF unit 20 may, in other words, restrict a configurable range of the bandwidth of the signal. AAF unit 20 may be employed to restrict the bandwidth of a signal to given channels or ranges to permit sampling of these different bandwidth ranges or channels in order to detect whether the range or channel is currently in use or free for use in SDR applications. Sampler unit 21 may represent a unit that performs sampling in the analog domain to sample the anti-aliased analog signal output from AAF unit 20. While shown as separate units in the example of FIG. 1, at least some operations of AAF unit 20 may be integrated within sampling unit 21 to form a combined AAF/sampling unit, in some instances. For instance, sampling unit 21 may integrate some AAF filtering effects, like current-domain sampling.

Each of ADC units 22 may represent a unit that converts analog signals to digital representations of the analog signals (so-called "digital signals"). More specifically, each of ADC units 22 may convert a continuous analog signal to a discrete time digital representation of the continuous analog signal. DSP unit 24 may represent a unit that performs digital signal processing on the digital signals output by each of ADC units 22. DSP unit 24 may perform any number of digital signal processing algorithms, including filtering algorithms (such as algorithms directed to causal filtering, time-invariant filtering, stable filtering, finite impulse response (FIR) filtering) and transform algorithms (such as algorithms to perform fast Fourier transforms (FFTs), discrete cosine transforms (DCTs), and discrete wavelet transforms (DWTs)). DSP unit 24 may include a digital calibration unit 26 that may perform digital calibration of ADC units 22, CRAFT unit 12 and sampler unit 21 to account for fabrication disparities. Radio control unit 27 may represent control logic comprising hardware or a combination of hardware and software that control operation of PLL unit 18, AAF unit 20 and sampler unit 21.

Software defined radios (SDR) may strive to digitize radio frequency (RF) signals and perform spectrum sensing in the digital domain. SDRs perform this spectrum sensing to determine where available or unused spectrum and unavailable or used spectrum resides in order to provide spectrum for use in communicating an RF signal. However, attempting to perform spectrum sensing for wideband inputs often translates to impractical or potentially infeasible analog-to-digital converters (ADC) specifications.

CRAFT unit 12 may perform the techniques described in this disclosure to provide an analog domain front-end channelizer for SDR unit 10. In some examples, CRAFT unit 12 may be based on a 16-point analog domain fast Fourier transform (FFT). CRAFT unit 12 relies on charge re-use to potentially achieve 47 decibels (dB) average output signal-to-noise and distortion ratio (SNDR) on a 5 giga-samples per second (GS/s) input, and may consume 12.2 pico Joules (pJ) per conversion (pJ/conv), which may represent orders of magnitude of improvement over conventional designs. As a result of the potentially large instantaneous input bandwidth, high linearity, and low power channelization capabilities, CRAFT unit 12 may enable an RF front-end channelizer that may significantly reduce the sample rate and dynamic range requirements for wide-band digitization in SDRs, as one example. Additionally, while described with respect to a particular type of application, i.e., SDR in this example, these techniques may be extended to improve the performance of other passive switched capacitor designs used in other applications.

Operations performed by CRAFT unit 12 may be based on charge re-use, meaning that once sampled, the charge on a capacitor (for example) is shared and re-shared with other charge samples such that the resulting mathematical manipulation is an in-place DFT. By basing CRAFT unit 12 only on toggling switches (which may be transistor gates), the low power and high speeds noted above may be enabled. Additionally, power consumed by CRAFT unit 12 typically scales with frequency, supply and technology in a digital-like fashion (meaning that power consumption may be reduced as transistor fabrication technology enables faster transistor operation and decreases in transistor size).

The computations performed by CRAFT unit 12 may be termed "destructive" in the sense that the input values are altered by any one operation due to the charge re-use aspect of CRAFT unit 12. Consequently, CRAFT unit 12 may maintain or store multiple copies of each data value so that multiple operations on the same value may be performed. To reduce the number of copies CRAFT unit 12 may be required to store or otherwise maintain, CRAFT unit 12 may implement a radix-2 FFT algorithm that performs the DFT with a minimum number of operations per operation per stage compared to other FFT algorithms.

To perform the FFT algorithm, CRAFT unit 12 may sample the input signal from AAF unit 20 onto one or more capacitors. To perform an FFT butterfly operation, CRAFT unit 12 operates on each input twice. To perform complex operations (meaning operations on complex numbers having a real and imaginary part), CRAFT unit 12 operates on each input twice. Considering that the FFT butterfly typically involves at least one complex operation involving a complex number, CRAFT unit 12 typically stores at least four copies of each input. Also, considering that I, Q (=2) (where I refers to in-phase signal and Q refers to a quadrature for a complex signal) and differential (=2) inputs (which refers to a signal that is represented by both positive and negative components), a 16-point FFT requires 16 (i.e., the number of points or taps) times two (complex math) times two (butterfly branches) times two (I, Q) times two (differential) for a total of 256 sampling capacitors to store the 256 copies of the inputs. More information regarding the FFT butterfly operations as performed by CRAFT unit 12 is described below with respect to FIG. 3, while the layout of CRAFT unit 12 is described below in more detail with respect to FIGS. 4 and 5.

In operation, SDR unit 10 receives RF signals via antenna 14, where LNA unit 16 amplifies potentially weak aspects of the received RF signals. PLL unit 18 receives the amplified signal from LNA unit 16 and operates to synch the phase of the amplified RF signal with the oscillator so as to lock onto any potential signals, differentiating the signals from random or other noise and outputting any signals or lack thereof to AAF unit 20. AAF unit 20 may then perform anti-aliasing to restrict bandwidth of a signal or, in other words, select one or more channels or ranges of the signal received from PLL unit 18. AAF unit 20 may output one or more ranges or channels of the signal to sampler unit 21, which samples the anti-aliased signal. Sampler unit 21 outputs the sampled signal to CRAFT unit 12, which may as described above, store 256 copies of what may be referred to as an "input signal" (when discussed from the perspective of CRAFT unit 12).

CRAFT unit 12 may then transform this analog input signal to generate a transformed analog output signal. In some examples, CRAFT unit 12 may perform an FFT to transform the analog input signal to generate an FFT transformed analog output signal, acting as an RF front-end channelizer unit. CRAFT unit 12 may represent a passive analog multi-stage charge re-use linear transform circuit in that CRAFT unit 12 does not require active circuit components to convert voltage values to charge values in between two or more passive charge re-use stages but instead utilizes what may be referred to as "passive" switching to switch charge values from one stage to another stage. Moreover, application of an FFT constitutes one type of linear transform and, thus, CRAFT unit 12 may represent a linear transform circuit. CRAFT unit 12 may output the transformed analog output signal to one or more of ADC units 22 of SDR unit 10 so as to enable DSP unit 24 to perform wideband spectrum sensing using one or more of the signal processing algorithms described above. In some examples, one or more amplifiers (not shown) included in SDR unit 10 may amplify the transformed analog output signal outputted by CRAFT unit 12 and may output the amplified and transformed analog output signal to ADC units 22 of SDR unit 10. Amplifying the transformed analog output signal may provide additional channelization benefits. For example, by amplifying the transformed analog output signal the FFT performed by CRAFT unit 12 may appear to be higher in resolution to ADC units 22.

Figure 2:
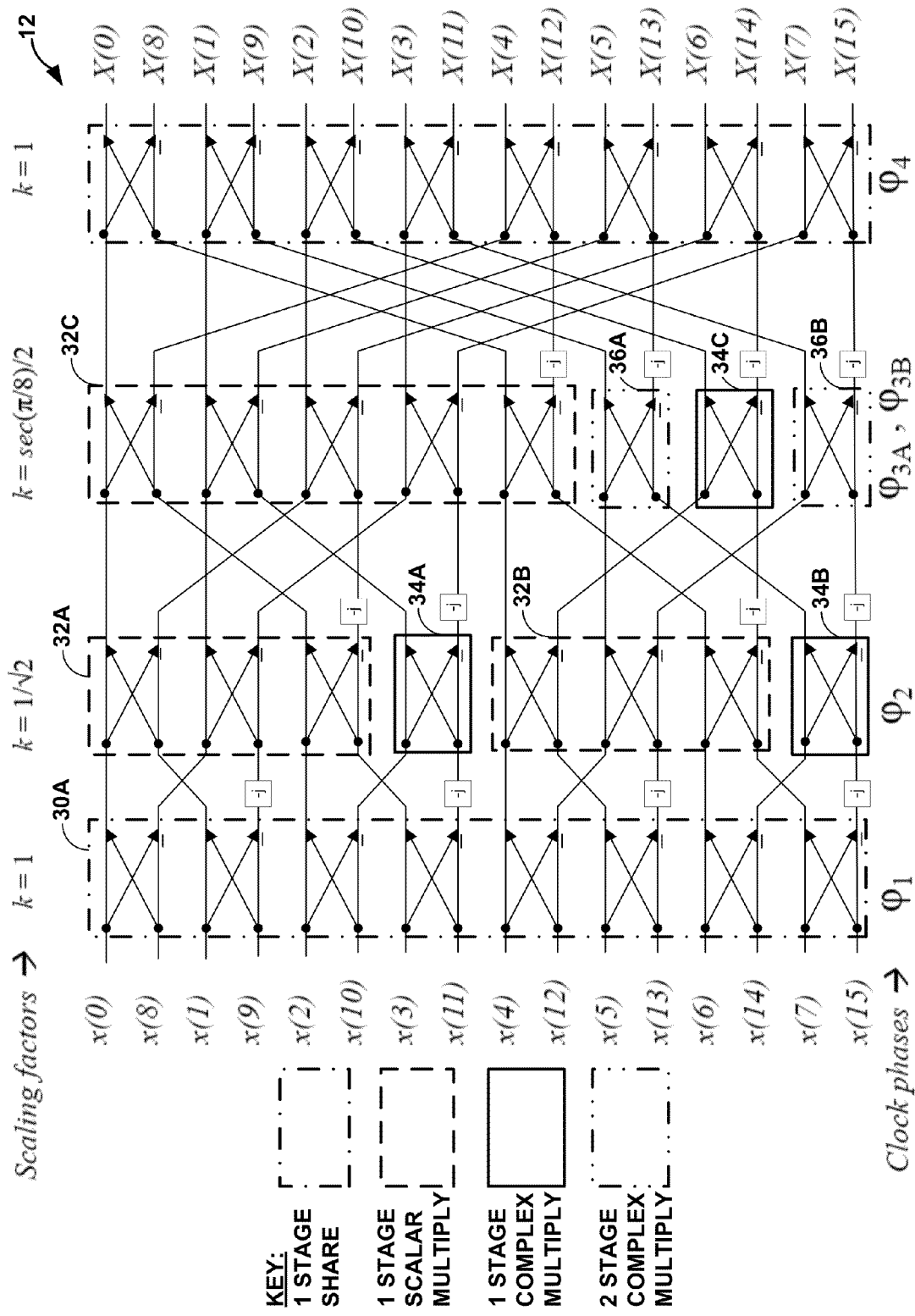
FIG. 2 is a diagram illustrating an FFT algorithm performed by the CRAFT unit shown in the example of FIG. 1 in accordance with one aspect of the techniques described in this disclosure.

FIG. 2 is a diagram illustrating an FFT algorithm performed by CRAFT unit 12 of FIG. 1 in accordance with one aspect of the techniques described in this disclosure. The FFT algorithm receives inputs x(0)-x(15) and generates outputs X(0)-X(15) by performing a series of charge re-use-based butterfly operations. To perform the FFT algorithm, CRAFT unit 12 performs a first series of butterfly operations 30A. Butterfly operations 30A implement a one-stage share (or, in other words, addition or summation), where some of the outputs of butterfly operations 30A are multiplied by the imaginary number −j. Butterfly operations 30A may represent the first stage of the multi-stage charge re-use FFT circuit denoted as CRAFT unit 12.

Butterfly operations 30A generate outputs after clock phase $\phi_1$ using a scaling factor k equal to one, which are then operated on by the second stage of CRAFT unit 12 in clock phase $\phi_2$ by butterfly operations 32A, 32B and 34A-34B. That is, the second stage of CRAFT unit 12 includes butterfly operations 32A, 32B and 34A-34B. Each of butterfly operations 32A, 32B effectively performs a one-stage scalar multiply by a scaling factor k equal to $1/\sqrt{2}$ (1 divided by square root of 2). Butterfly operations 34A, 34B effectively perform a one-stage complex multiply, where the complex multiply refers to a multiplication involving complex numbers (which again may have a real and imaginary component). Again, one of the outputs of each of butterfly operations 32A, 32B, 34A, 34B may be multiplied by the imaginary number −j. The scaling factor k for the third stage operations is equal to the secant (sec) of the result of pi ($\pi$) divided by eight, with the result of the secant operations being further divided by two (i.e., $\sec(\pi/8)/2$ in this example).

The outputs of second-stage butterfly operations 32A, 32B, 34A, 34B may then be operated on by a third stage of CRAFT unit 12 in clock phases $\phi_{3A}$ and/or $\phi_{3B}$ by butterfly operations 32C, 34C, 36A, 36B. Butterfly operations 32C perform a one stage scalar multiply. Butterfly operation 34C performs a one-stage complex multiply. Butterfly operations 36A, 36B each perform a two-stage complex multiply, where each of the stages may comprise half the clock phase, meaning that each of operations 36A, 36B may be performed at twice the clock speed of the other butterfly operations so as to only require a single clock phase. One of the outputs of each of butterfly operations 32C, 34C, 36A, 36B may be multiplied by imaginary number −j.

The outputs of third-stage butterfly operations 32C, 34C, 36A, 36B may then be operated on by a fourth stage of CRAFT unit 12 in clock phase $\phi_4$, by butterfly operations 30B. Butterfly operations 30B perform a one-stage share with a scale factor k equal to one, outputting outputs X(0)-X(15). CRAFT unit 12 therefore performs the FFT algorithm in four stages. The number of stages may vary based on the number of points or taps the FFT algorithm support as a function of $\log_2(N)$, where N refers to the number of points or taps. Thus, for the 16-point FFT algorithm implemented by CRAFT unit 12, the number of stages equals $\log_2(16)$ or four. The construction of these butterflies using switches and capacitors and multiplication by imaginary number −j is described below with respect to the examples of FIGS. 3A-3F.

In operation, CRAFT unit 12 may employ the various butterfly operations described above to transform an analog input signal to generate a transformed analog signal and then output the transformed analog signal. CRAFT unit 12 may transform the analog input signal by receiving the analog input signal, where the first passive analog circuit of CRAFT unit 12, e.g., butterfly operations 30A, process the analog input signal in a charge domain to generate an analog output signal and output the analog output signal in the charge domain such that a second passive analog circuit, e.g., butterfly operations 32A, 32B, 34A, 34B, is able to directly operate on the analog output signal in the charge domain. In some instances, the first passive analog circuit, e.g., butterfly operations 30A, may output the analog output signal in the charge domain such that the second passive analog circuit, e.g., butterfly operations 32A, 32B, 34A, 34B, is able to directly operate on the analog output signal in the charge domain without having to convert the analog output signal from a voltage domain to the charge domain.

CRAFT unit 12 may, in performing any one of the above noted butterfly operations 30A, 30B, 32A, 32B, 34A, 34B, 36A, 36B ("butterfly operations 30-36"), perform an add and scale operation on the analog input signal in the charge domain to generate the analog output signal.

FIGS. 3A-3F are diagrams each illustrating construction of different charge re-use operation units or functions in accordance with the techniques described in this disclosure and a corresponding symbol representative of these operations. Many of these operations may be used in performing the butterfly operations shown in the example of FIG. 2. In each of FIGS. 3A-3D, the symbol of the operation is shown to the left of the double arrow and the corresponding circuit implementation of the respective operations is shown to the right of the double arrow. For each circuit implementation, passive circuitry is use to form the operational unit. In each of FIGS. 3E, 3F, the symbol is shown above the double arrow and the corresponding implementation is shown below the double arrow. The double arrow in each instance denotes correspondence.

Figure 3A:
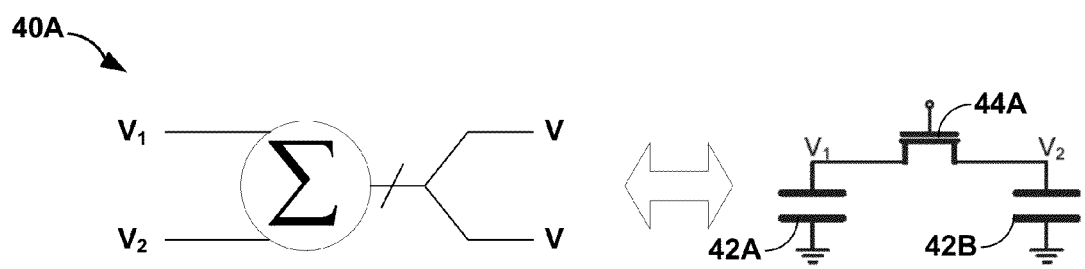

FIG. 3A is a diagram illustrating a charge re-use based share (or addition) operation both in terms of the implementation and symbol 40A used to represent the share operation. In the example of FIG. 3A, share symbol 40A indicates that $V_1$ is added to $V_2$, which may be implemented as two grounded capacitors 42A, 42B storing $V_1$ and $V_2$, respectively, that are coupled via switch 44A. Mathematically, the output of this share operation may be a voltage V, where this voltage V may be expressed according to the following equation (1):

$$V = \frac{V_1 + V_2}{2}. \tag{1}$$

Figure 3B:
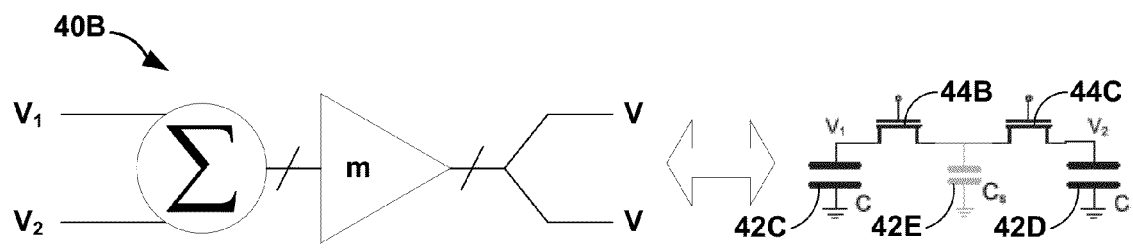

FIG. 3B is a diagram illustrating a charge re-use based share and multiply operation both in terms of the implementation and symbol 40B used to represent the share and multiply operation. Symbol 40B indicates that $V_1$ is added to $V_2$ and then multiplied by a variable m, outputting a voltage V. This share and multiply operation may be implemented using two equally sized and grounded capacitors 42C, 42D (each denoted as "C") and another grounded capacitor 42E denoted as "$C_s$" that are coupled to one another via switches 44B and 44C. Mathematically, the output of this share and multiply operation may be a voltage V, where this voltage V may be expressed according to the following equations (2) and (3):

$$V = (V_1 + V_2) \cdot m; \tag{2}$$

and $$m = \frac{C}{2 \cdot C + C_s}. \tag{3}$$

Figure 3C:
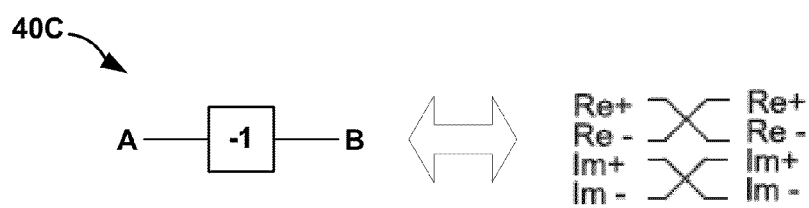

FIG. 3C is a diagram illustrating a charge re-use based negation operation both in terms of the implementation and symbol 40C used to represent the negation operation. Symbol 40C indicates that input A is negated to form output B, which may be implemented by negating the real portion of A and the imaginary portion of A to form the real and imaginary portions of B. Mathematically, the negation operation may be expressed in accordance with the following equation (4):

$$A \times (-1) = B. \tag{4}$$

Figure 3D:
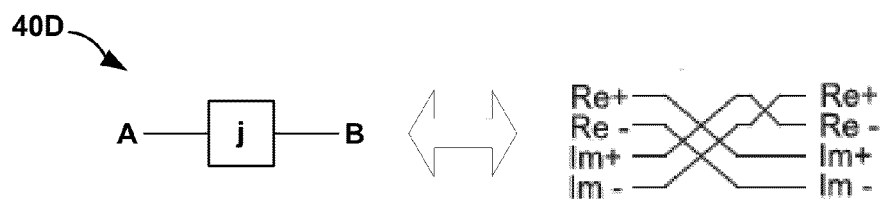

FIG. 3D is a diagram illustrating a charge re-use based multiplication by imaginary number j both in terms of the implementation and symbol 40D used to represent this operation. Symbol 40D indicates that input A is multiplied by imaginary number j to form output B, which may be implemented by converting the real portion of A to become the imaginary portion of B and converting the imaginary portion of A to become the real portion of B such that the real portion of B is the negated version of the imaginary portion of A. Mathematically, the negation operation may be expressed in accordance with the following equation (5):

$$A \times (j) = B. \tag{5}$$

Figure 3E:
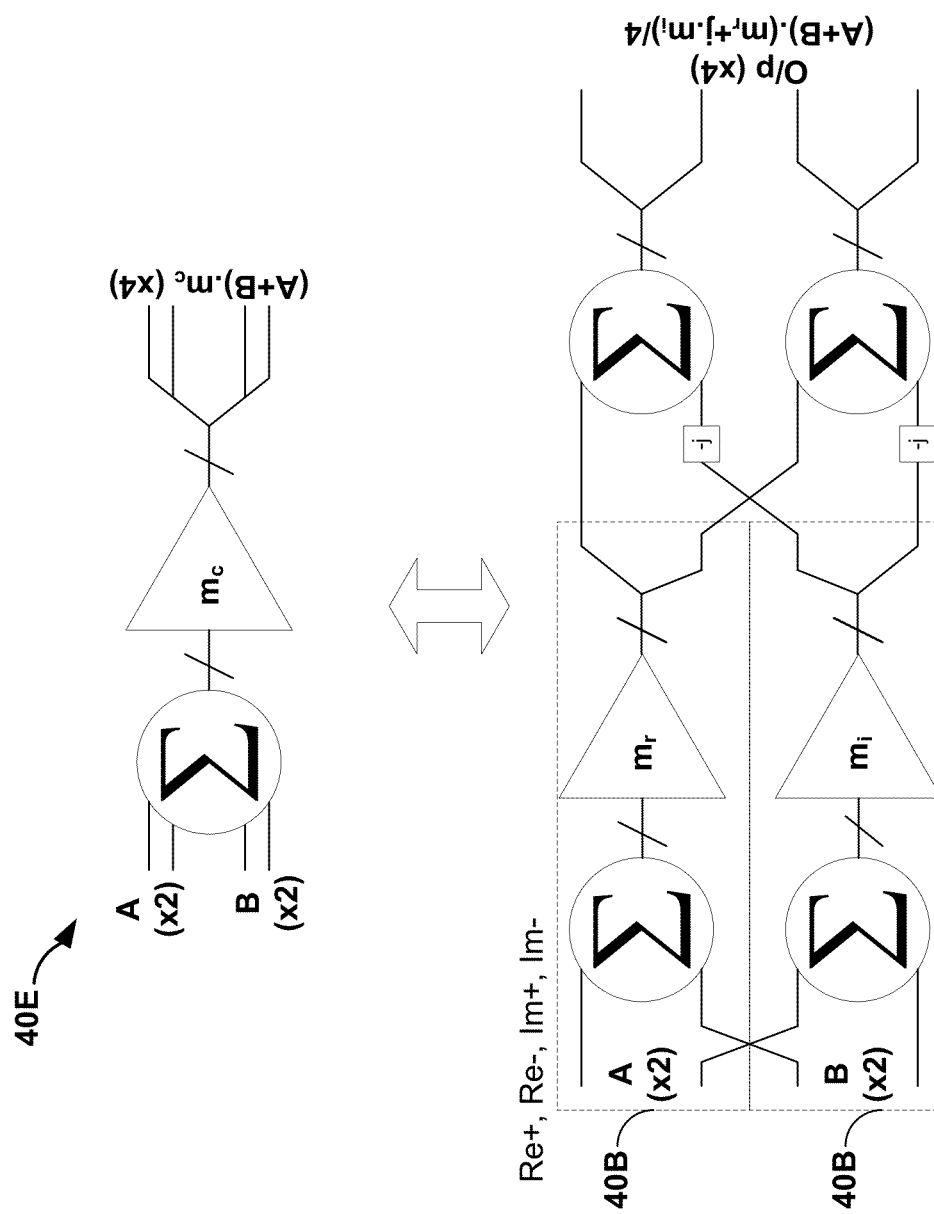

FIG. 3E is a diagram illustrating a charge re-use based share and complex multiplication operation, both in terms of the implementation and symbol 40E used to represent this operation. Symbol 40E indicates that two copies (hence the indication of ×2 in FIG. 3E) of A (each copy having both real and imaginary portions) is added to B (again both real and imaginary portions) and then multiplied by a variable $m_c$, outputting a voltage equal to $(A+B)m_c$ (forming four copies that each contain real and imaginary portions). This share and complex multiply operation may be implemented as two share and multiply operations 40B (which is described above in more detail with respect to the example of FIG. 3B). The lower output of each of the share and multiply operations 40B are then negated (which is described above in more detail with respect to the example of FIG. 3C) and multiplied by imaginary number j (which is described above in more detail with respect to the example of FIG. 3D). Moreover, to implement this share and complex multiply operation, one output of each of share and multiply operations 40B and the negated and j-multiplied output are then passed to each of share operations 40A (which is described above in more detail with respect to FIG. 3A). Mathematically, the output of this share and multiply operation may be a voltage denoted O/p (four copies, each having real and imaginary components), where this voltage O/p may equal $(A+B) \cdot (m_r + m_i)/4$. The $m_c$ shown in symbol 40E may be expressed mathematically in accordance with the following equation (6)

$$m_c = m_r + j \cdot m_i. \tag{6}$$

FIG. 3F is a diagram illustrating a charge re-use based butterfly operation both in terms of the implementation and symbol 40F used to represent this operation. Symbol 40F indicates that a butterfly operation is performed with respect to A and B, outputting two values equal to $(A+B) \cdot W_A/4$ and $(A+B) \cdot W_B/4$. This butterfly operation may be implemented as two share and complex multiply operations 40E (which is described above in more detail with respect to the example of FIG. 3E). The lower B input of each of the bottom share and complex multiply operation 40E are negated (as denoted by symbol 40C, which is described above in more detail with respect to the example of FIG. 3C).

In this respect, as noted above, these different circuit implementations may involve two or more capacitors, where the two or more capacitors are approximately the same size. In some instances, two or more, and possibly all, of the first, second, third and fourth stages of multi-stage CRAFT unit 12 may each be implemented using two or more capacitors that are all approximately the same size, which may enable the passive circuitry aspect of CRAFT unit 12 in that by using capacitors of the same size CRAFT unit 12 may not require or otherwise include any circuitry to convert output from one stage back to the charge domain. Hence, in some examples, the CRAFT unit 12 may use only passive circuitry for mathematical operations, and not include active circuitry. Thus, these circuits may not include any active circuit components such as, e.g., circuit components that require power from a separate power source.

To implement the above described FFT algorithm, only two types of operations may be required (although any operation may be comprised of other operations as is the case in the butterfly, which requires two share and complex multiply operations, a multiply by j operation and a negation, where the share and complex multiply operations requires a multiply by j, a negation a share and multiply and a share). The first operation may be an addition and the second operation may be a sub-unity coefficient multiplication. Charges from two capacitors (which as noted above may be the same size) are shared to perform the addition. Subsequent sub-unity coefficient multiplication is performed by stealing charge away from the shared output using a suitably sized capacitor ($C_s$). These techniques may be extended to perform complex multiplication as described above with respect to FIGS. 3A-3F. An example butterfly operation using multiple complex multiplications is shown in FIG. 3F, where these butterfly operations may be used to construct 16-point CRAFT unit 12 in the manner described above with respect to FIG. 2.

Figure 4:
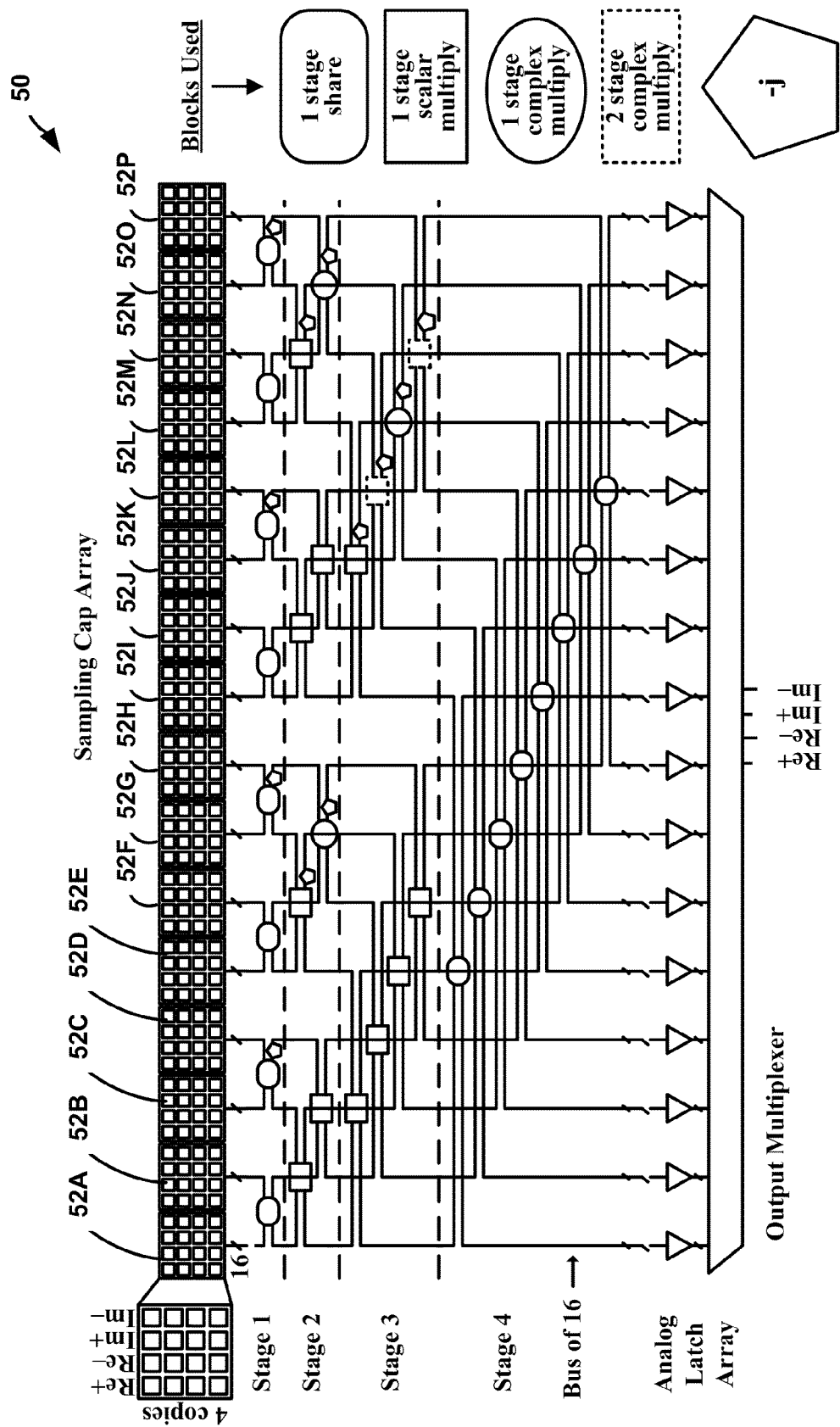
FIG. 4 is a diagram illustrating an exemplary implementation of the CRAFT unit shown in the example of FIG. 1.

FIG. 4 is a diagram illustrating an exemplary implementation 50 of CRAFT unit 12. Implementation 50 may closely resemble or otherwise emulate the layout implementation of CRAFT unit 12 shown in the example of FIG. 2. As shown in the example of FIG. 4, each input sample may be stored using a set of 16 capacitors (four copies of differential and complex inputs). Each set of 16 capacitors is denoted in FIG. 4 as capacitor sets 52A-52P ("capacitor sets 52"), for a total of 16 capacitor sets (and 256 capacitors). The 256 capacitors (which may be referred to as "sampling capacitors") may run at 5 GS/s with a single-ended input switch of ±300 mV ($V_{pp,diff}$=1.2 V) and 60 decibels (dB) spurious-free dynamic range (SFDR). The sampling capacitors may each be approximately the same size (with slight differences due to manufacturing tolerances) at 200 femtofarad (fF) each such that the per-bin output referred thermal noise on capacitors (kT/C) noise contributed by implementation 50 of CRAFT unit 12 due to the sampling and processing operations may be 65 dB below the output full-scale signal.

In the example of FIG. 4, from each of capacitor sets 52 extends a bus, each of which is 16 wires wide, that connects the sampling capacitors and runs through the core of CRAFT implementation 50. The wires of the buses may always be connected to the sampling capacitors. Consequently, the parasitic capacitance of the bus wires forms a part of the sampler and may need to be accurately matched. Additionally, sin ce the operations are generally performed in-place, the outputs may appear on the sampling capacitors at the end of the processing phase.

The CRAFT core (meaning everything of implementation 50 beyond capacitor sets 52) may perform the FFT operation in four stages, as noted above. As described above with respect to FIGS. 3A-3F, each butterfly is implemented using switches and scaling capacitors that may perform a set of share and multiply operations on the input samples. The switches and wires may be sized to provide 7τ settling at 5 GS/s, where 7τ refers to an amount of settling. Tau (τ) refers to a settling time-constant in an exponential function representing the circuit's response versus time.

Figure 6:
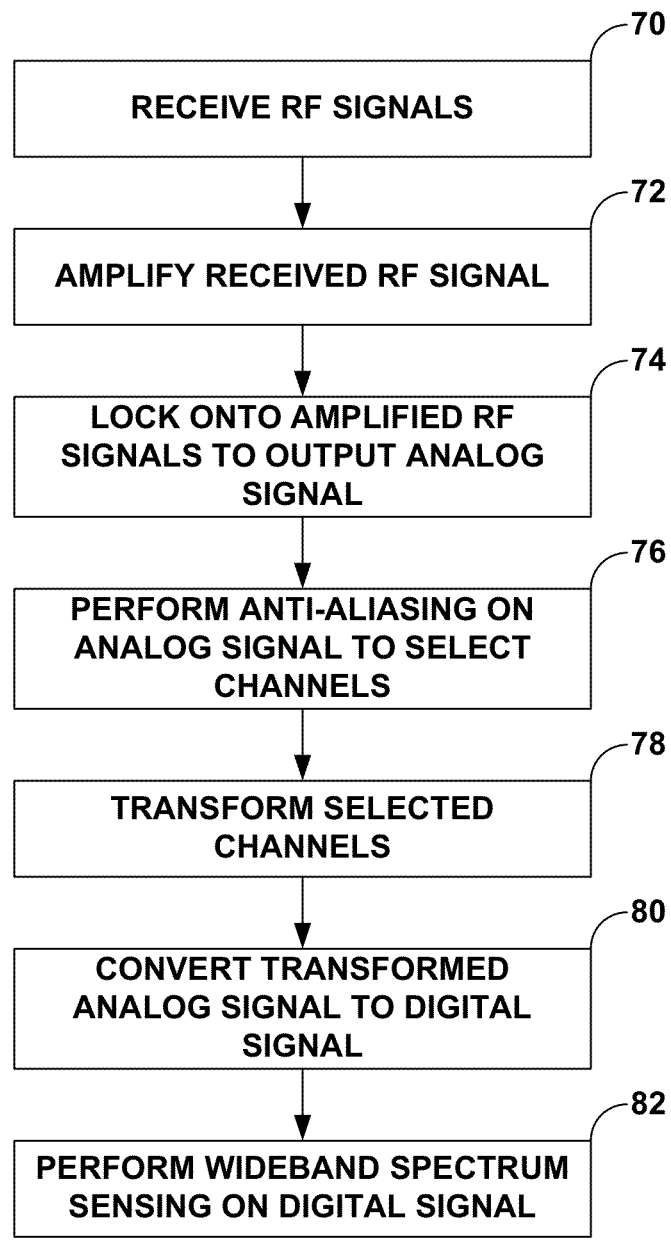
FIG. 6 is a flowchart illustrating exemplary operation of the SDR unit shown in the example of FIG. 1 in implementing the techniques described in this disclosure.

The four stages of CRAFT operation are denoted on the left-hand side of FIG. 6, where each stage is separated by the other using a dashed line. In the first stage, the neighboring buses may share their charge. In the second stage, share and scalar multiply operations may be performed. Multiplication by $$\left(\frac{1}{\sqrt{2}} + \frac{1}{\sqrt{2}}j\right)$$

may be performed in a single step (unlike as shown in the examples of FIGS. 3A-3F) by exploiting $m_c=m_r$. This may increase settling time and minimize attenuation. In the third stage, share and multiply operations based on the butterfly operation may be performed. Again, prior knowledge of the coefficients may be utilized to minimize attenuation. The fourth stage may perform a share operation. Using the share and multiply techniques, CRAFT implementation 50 may require only 5 clock phases to perform the FFT computation. Moreover, the total attenuation may be limited to 0.38 (which may be 6.5× superior to an unmodified implementation of CRAFT unit 12).

In some instances, implementation 50 shown in the example of FIG. 4 may imitate the signal flow shown in the example of FIG. 3F. As a result, after each operation, half of the bus wires may return to their bus while the rest continue to one or more of the other buses. To equalize the wiring parasitics, switches may be placed midway between two operand buses. Two example wires, one of which may always return to its bus, while the other of which may always shift on to one of the other operand buses, are highlighted in the example of FIG. 5. The highlighted wires may be of similar lengths meaning that their parasitics may be nominally matched.

At the bottom of CRAFT implementation 50, the wires of the buses connect through switches to 32 (16×2 for real and imaginary) operational transconductance amplifier (OTA) based analog latches that save the outputs prior to being read out. To match CRAFT performance, a two-stage, folded-cascade, differential (OTA) with 70 dB gain and 1 gigahertz (GHz) unity gain bandwidth (UGB) may be used.

Figure 5:
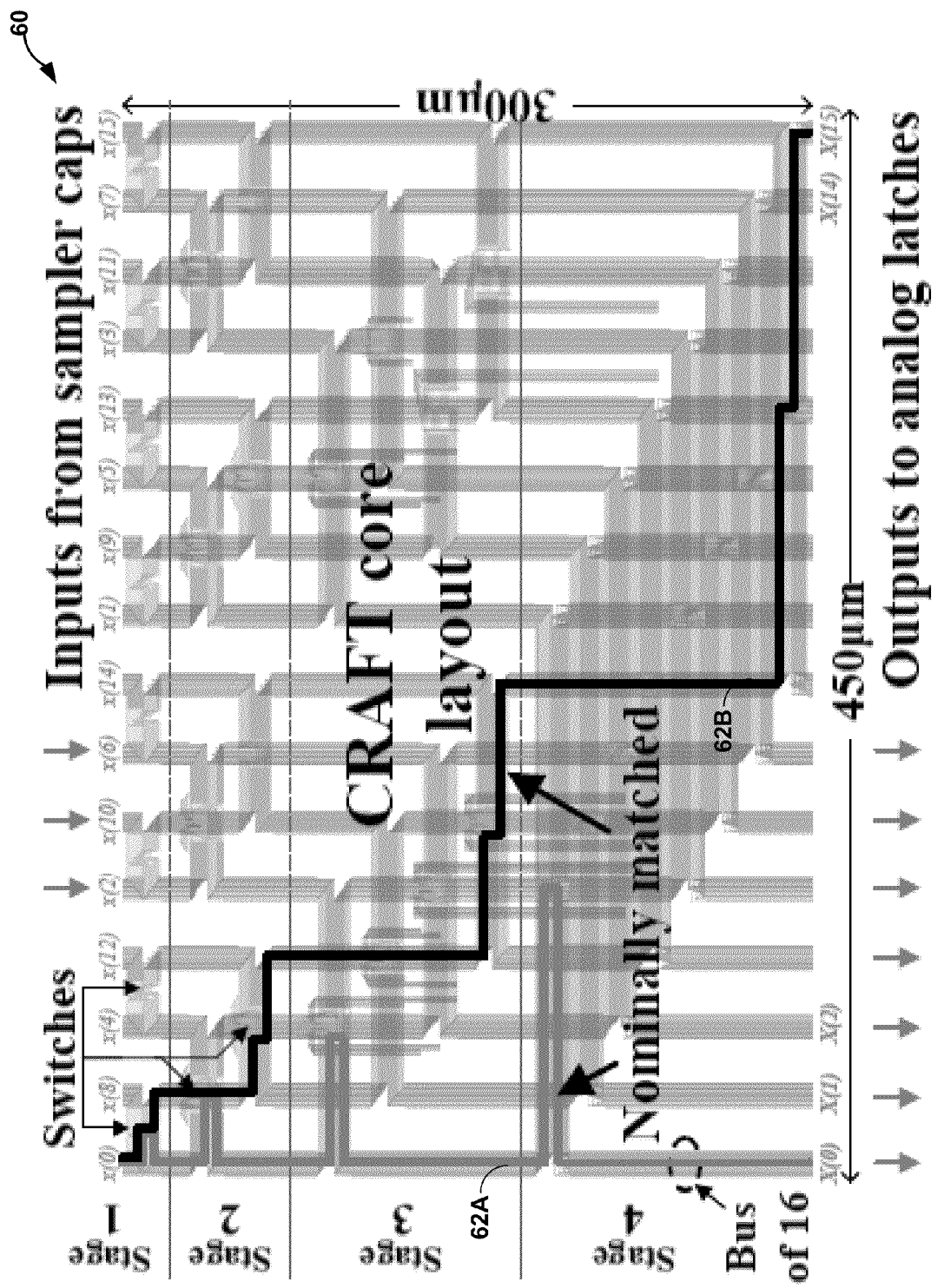
FIG. 5 is a diagram providing a screenshot of a circuit layout of the CRAFT implementation shown in the example of FIG. 4.

FIG. 5 is a diagram providing a screenshot 60 of CRAFT implementation 50, excluding capacitor sets 52. As noted above, the two highlighted wires, i.e., wires 62A, 62B, have been nominally matched to equalize wiring parasitics.

FIG. 6 is a flowchart illustrating exemplary operation of SDR unit 10 shown in the example of FIG. 1 in implementing the techniques described in this disclosure. Initially, SDR unit 10 receives RF signals via antenna 14, where LNA unit 16 amplifies potentially weak aspects of the received RF signals (70, 72). PLL unit 18 receives the amplified signal from LNA unit 16 and operates to synch the phase of the amplified RF signal with the oscillator so as to lock onto any potential signals, differentiating the signals from random or other noise and outputting any analog signals or lack thereof to AAF unit 20 (74). AAF unit 20 may then perform anti-aliasing to restrict bandwidth of a signal or, in other words, select one or more channels or ranges of the signal received from PLL unit 18 (76). AAF unit 20 may output one or more ranges or channels of the signal to CRAFT unit 12, which may as described above, store 256 copies of what may be referred to as an "input signal" (when discussed from the perspective of CRAFT unit 12).

CRAFT unit 12 may then transform this analog input signal to generate a transformed analog output signal (78). In some examples, CRAFT unit 12 may perform an FFT to transform the analog input signal to generate an FFT transformed analog output signal, acting as a RF front-end channelizer unit. CRAFT unit 12 may represent a passive analog multi-stage charge re-use linear transform circuit in that CRAFT unit 12 does not require active components to convert voltage values to charge values in-between two or more passive charge re-use stages but instead utilizes what may be referred to as "passive" switching to switch charge values from one stage to another stage. Moreover, application of a FFT constitutes one type of linear transform and, thus, CRAFT unit 12 may represent a linear transform circuit. CRAFT unit 12 may output the transformed analog output signal to one or more of ADC units 22 of SDR unit 10, which may convert the transformed analog signal to a digital signal (80). DSP unit 24 may perform wideband spectrum sensing

(82) on the digital signals using one or more of the signal processing algorithms described above.

Figure 7:
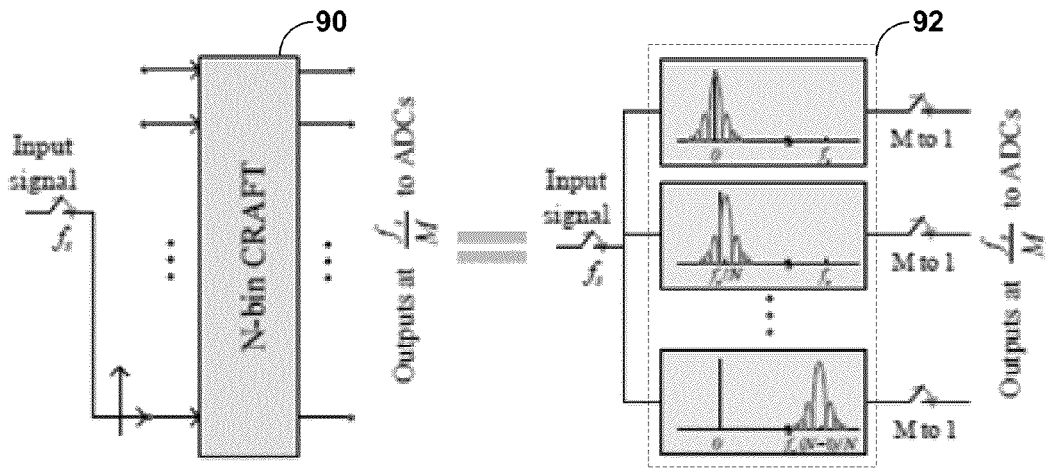
FIG. 7 is a diagram illustrating a frequency domain functional equivalent of a discrete Fourier transform (DFT) comprising N-path bandpass filters.

FIG. 7 is a diagram illustrating a frequency domain functional equivalent of a discrete Fourier transform (DFT) comprising N-path bandpass filters. In the example of FIG. 7, an N-bin CRAFT unit 90 is shown to be equivalent to a DFT 92 comprising N-path bandpass filters. N-bin CRAFT unit 92 may represent a generalization of 16-bin CRAFT unit 12 shown in the examples of FIGS. 1, 2. In any event, N-bin CRAFT unit 92 may effectively implement a DFT comprising N-path bandpass filters.

Figure 8:
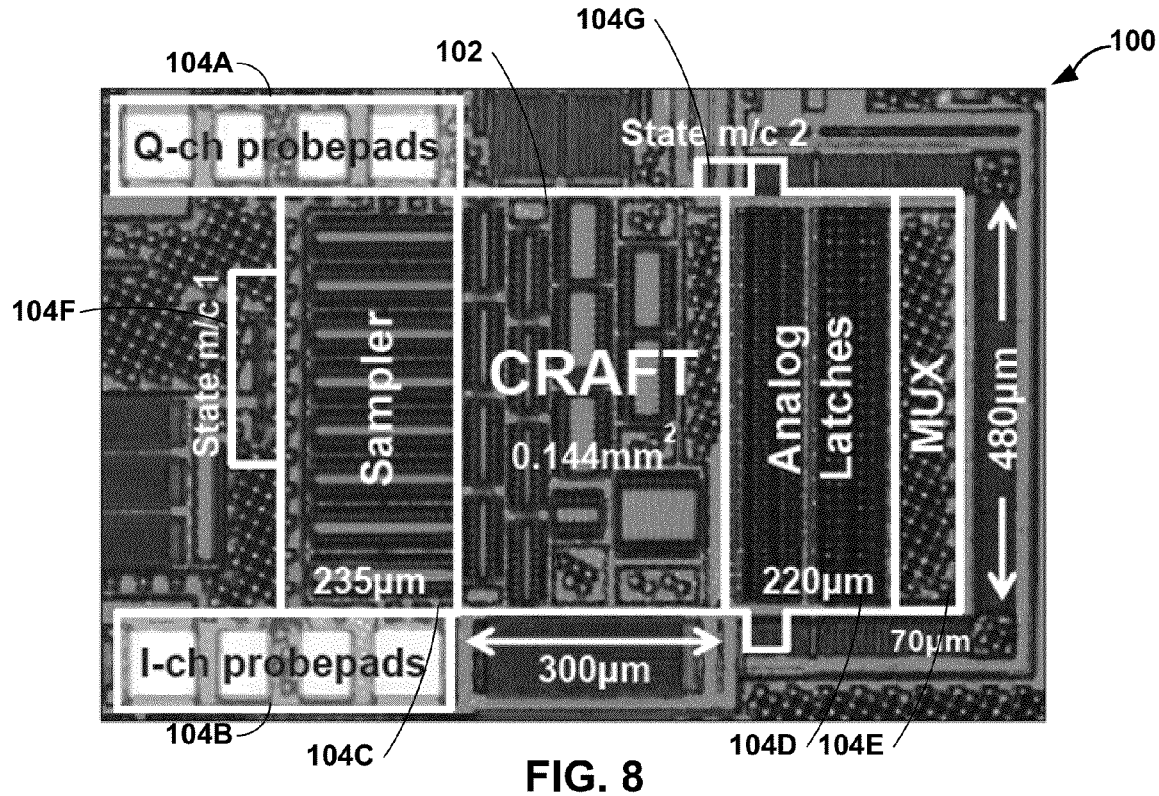
FIG. 8 is a die photo showing an exemplary CRAFT core unit and supporting circuitry.

FIG. 8 is a die photo 100 showing an exemplary CRAFT core unit 102 and supporting circuitry 104A-104G. CRAFT core unit 102 may represent one example die of CRAFT core 60 shown in the example of FIG. 5. Circuitry 104A and 104B may represent Q-channel (Q-ch) probe pads and I-channel (I-ch) probe pads used by a test system described with respect to FIG. 9 below to gather test results. Circuitry 104C may represent 16 sampler capacitor sets 52 described above with respect to FIG. 4. Likewise, circuitry 104D, 104E may represent the analog latches and multiplexor (MUX) described above also with respect to FIG. 4. Circuitry 104F, 104G may represent control units.

Figure 9:
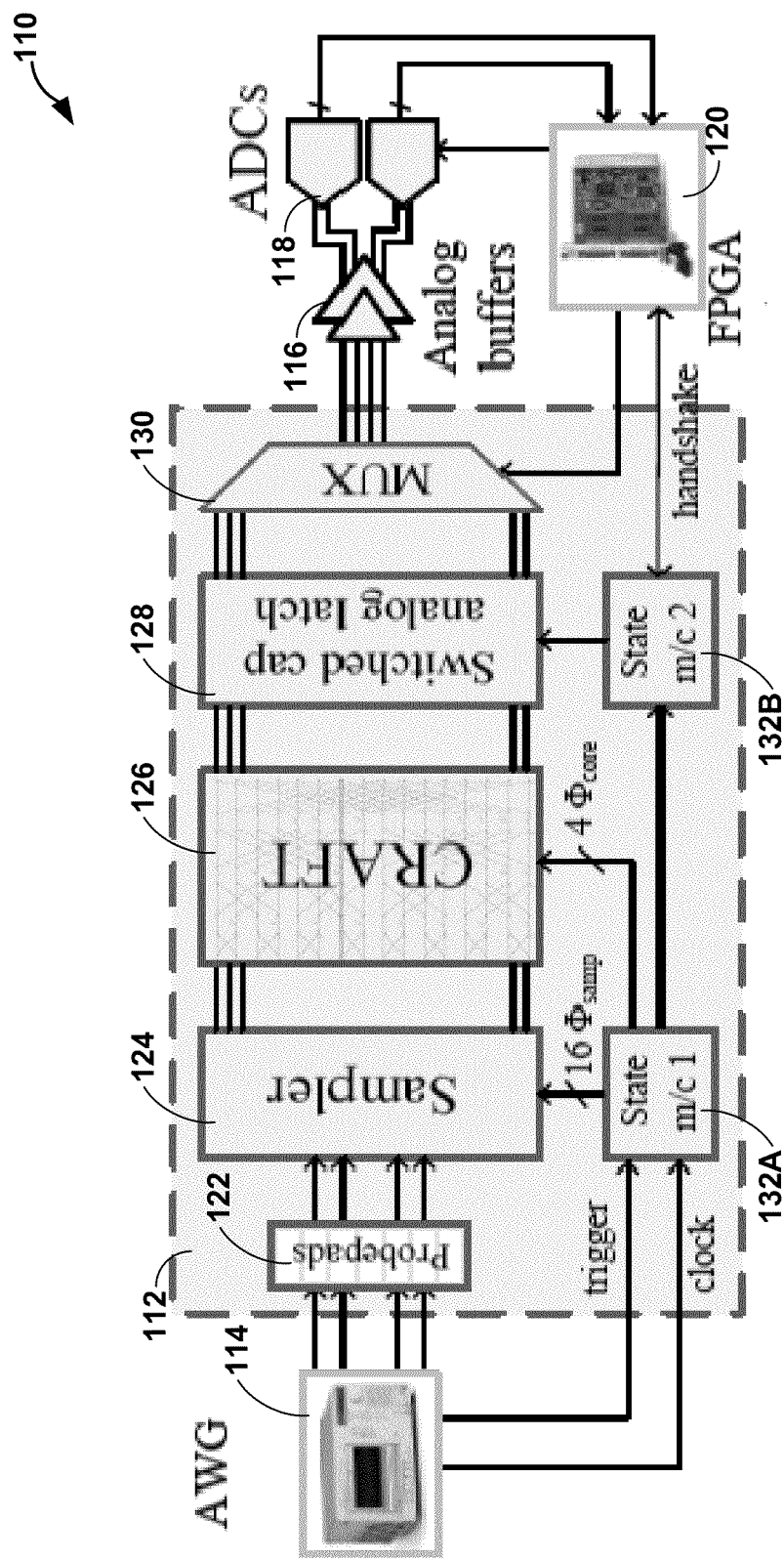
FIG. 9 is a diagram illustrating an exemplary test system used to evaluate operation of the CRAFT unit that operates in accordance with the techniques described in this disclosure.

FIG. 9 is a diagram illustrating an exemplary test system 110 used to evaluate operation of CRAFT unit 112 that operates in accordance with the techniques described in this disclosure. Test system 110 includes an arbitrary waveform generator (AWG) 114, CRAFT unit 112, analog buffer units 116, analog-to-digital converter (ADC) units 118 and a field programmable gate array (FPGA) 120. AWG 114 may generate waveforms and effectively simulate the RF portion of SDR unit 10 shown in the example of FIG. 1. CRAFT unit 112 may implement the techniques described in this disclosure to effectively sample and transform an analog signal using an FFT algorithm. Analog buffers 116 may buffer the transformed analog signal output by CRAFT unit 112, where ADCs 118 may then convert the buffered analog signals to digital signals. FPGA 120 may be configured to process the output of ADCs 118 and assist in generating clocks used for executing various aspects of CRAFT unit 112.

As shown in the example of FIG. 9, CRAFT unit 112 includes probe pads unit 122, sampler unit 124, CRAFT core unit 126, switching cap and analog latch unit 128, multiplexer unit 130 and state machine units 132A, 132B. Probe pads unit 122 may represent a unit that enables AWG 114 to directly interface with CRAFT unit 112 potentially in lieu of an antenna to facilitate testing purposes (as one example). Sampler unit 124 may represent a unit that provides the 256 sampler capacitor sets (in the example of a 16-bin CRAFT unit) or any other number of sampler capacitor sets. CRAFT core unit 126 may represent a unit that provides the core CRAFT operation, i.e., implements the operations described above with respect to FIGS. 2, 3, 6, 7. Switched cap and analog latch unit 128 may represent a unit that provides for switched capacitors and analog latches to store the various outputs of CRAFT core unit 126. Multiplexer unit 130 ("MUX 130") may represent a unit that selects from among the stored output values. State machine units 132A, 132B may each represent a unit that adjusts the clocks of sampler unit 124, CRAFT core unit 126 and switched cap and analog latch unit 128.

As shown in the example of FIG. 9, the sampling, core and testing interface require multiple clocks to be generated. CRAFT unit 112 uses an input clock to generate internal signals. State machine unit 132A may be externally triggered and generates 16 sampling clock phases. State machine unit 132A may also generate the processing clocks that operate switches included within CRAFT core 126. State machine unit 132B may handshake with state machine unit 132A and external FPGA unit 120 to determine if the outputs and FPGA unit 120 are ready and subsequently generates the analog latch clocks. The latched outputs may be observed sequentially using MUX 130, which may be controlled by FPGA unit 120.

CRAFT unit 112 may rely heavily on digital circuits. Also, the regularity and complexity makes CRAFT unit 112 comparable to digital designs. However, CRAFT core unit 126 may comprise an analog circuit and, as a result, may be vulnerable to circuit non-idealities, including noise, matching and non-linearity. Consequently, accurate modeling of non-idealities may be critical. Moreover, switched capacitor circuit noise, charge-injections and charge accumulation are not well-modeled typically in circuit simulators. Consequently, CRAFT-specific models of non-idealities may be developed and a priori knowledge of operations may be exploited to devise circuit techniques, such as correlated noise reduction and differential settling error cancellation. Performance of CRAFT unit 112 may be optimized using these models, potentially enabling the high dynamic range, even at 5 GS/s.

Figure 10:
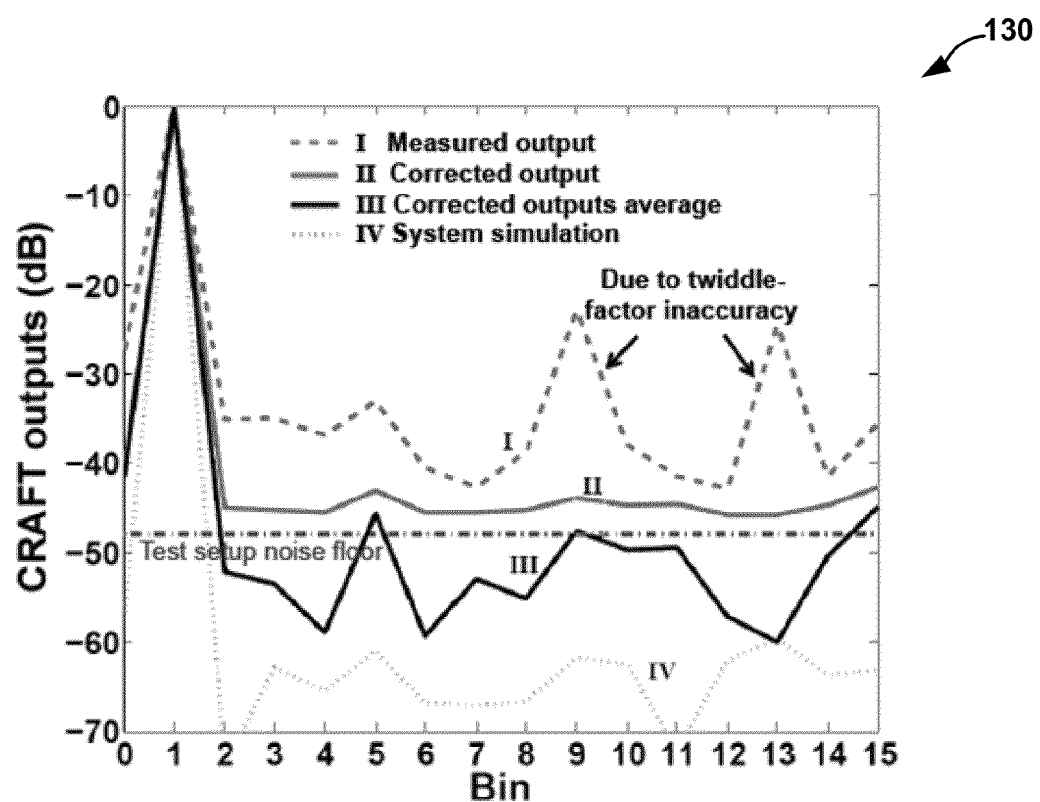
FIG. 10 is a graph showing CRAFT outputs with a 312.5 MHz (=5 GHz/16) single-tone input at 5 GS/s for CRAFT as implemented in accordance with the techniques described in this disclosure.

The CRAFT design has been implemented using a 65 nanometer (nm) complementary metal-oxide semiconductor (CMOS) process. Measurement results are shown in the examples of FIGS. 10-13. FIG. 10 is a graph 130 showing CRAFT outputs in dB with a 312.5 MHz (=5 GHz 16) single-tone input at 5 GS/s for CRAFT, as implemented in accordance with the techniques described in this disclosure, over a range of bins. Curve I shows the measured output magnitude across 16 bins. Ideally, all bins except bin 1 should be at the noise floor, but due to systematic inaccuracies in parasitic extraction, uncompensated interconnect capacitances on the stealing capacitors of this CRAFT version resulted in FFT twiddle factor errors. This causes a systematic input independent computation error. This inaccuracy is estimated in measurement using a training sample, and used for offline digital correction. Subsequent plots in this paper use the corrected values. Curve II in the example of FIG. 10 shows the corrected plot depicting the circuit noise floor at −46 dB. The test setup noise floor is at −48 dB as shown. To explore the non-linearity floor, a synchronous average over 500 measurements was used. The resultant Curve III shows the non-linearity floor with 48 dB SNDR per bin and 43 dB SFDR. The non-linearity predicted by our system level simulations is shown in Curve IV. The discrepancy with Curve III is attributed to non-idealities in the AWG generated inputs (8 bit resolution).

Figure 11A:
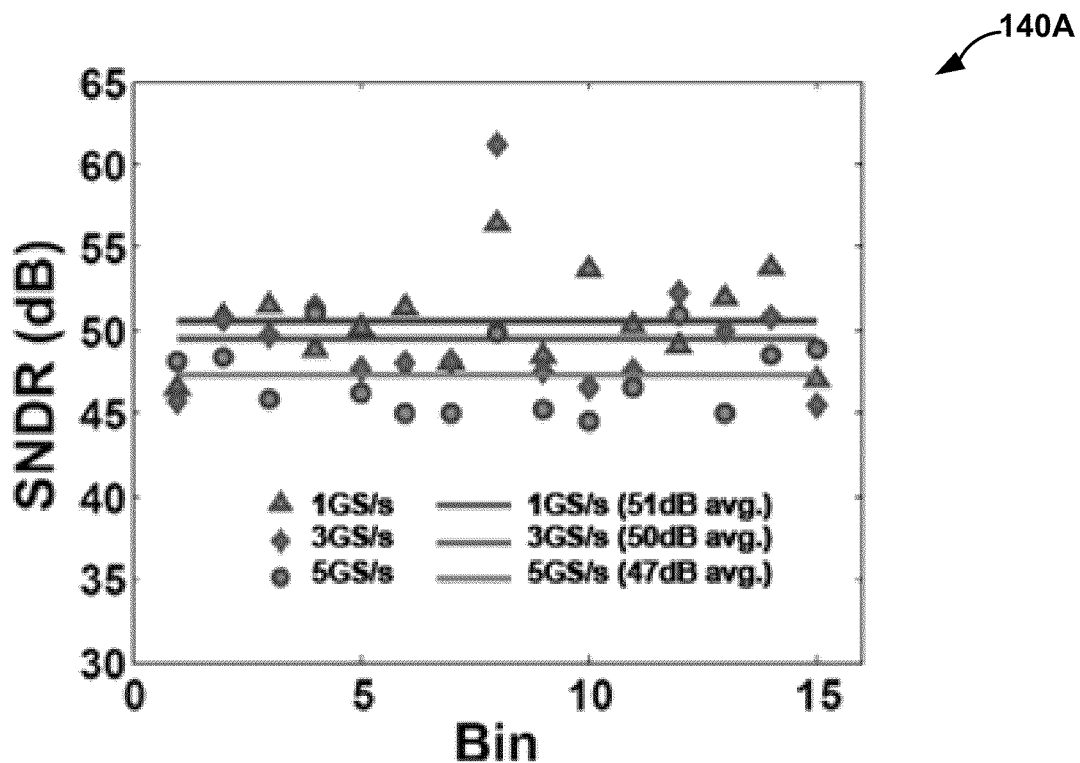
FIGS. 11A and 11B are graphs illustrating signal-to-noise radio and distortion ratio (SNDR) variation versus sampling speed and input amplitudes of CRAFT implemented in accordance with the techniques described in this disclosure.
Figure 11B:
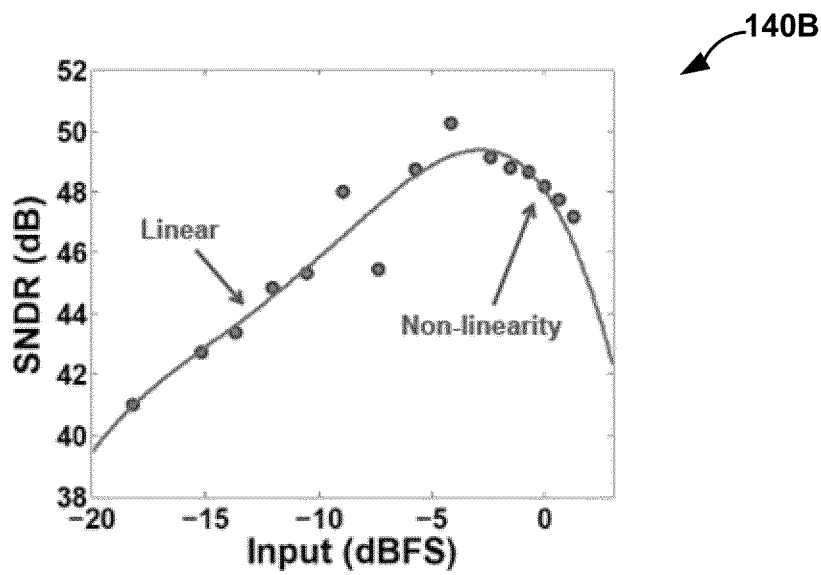

FIGS. 11A, 11B are graphs 140A, 140B illustrating signal to noise and distortion ratio (SNDR) variation versus sampling speed and input amplitudes, respectively, of CRAFT implemented in accordance with the techniques described in this disclosure. The SNDR at 1, 3, and 5 GS/s for a single-tone input frequency placed at different bins is shown in the example of FIG. 11A. The average SNDR across these input frequencies is ≈50 dB at 1 and 3 GHz and degrades to 47 dB at 5 GHz; SNDR better than 45 dB may be maintained across all frequencies. This may provide 7-8 bits of spectrum sensing resolution over a 5 GHz (2.5 GHz×2 due to I, Q) frequency range in the digital back-end.

Output SNDR with varying input amplitudes at 5 GS/s are shown in the example of FIG. 11B. A fourth-order fit shows a linear SNDR improvement with increasing amplitude before being limited by potential circuit non-linearities.

Figure 12:
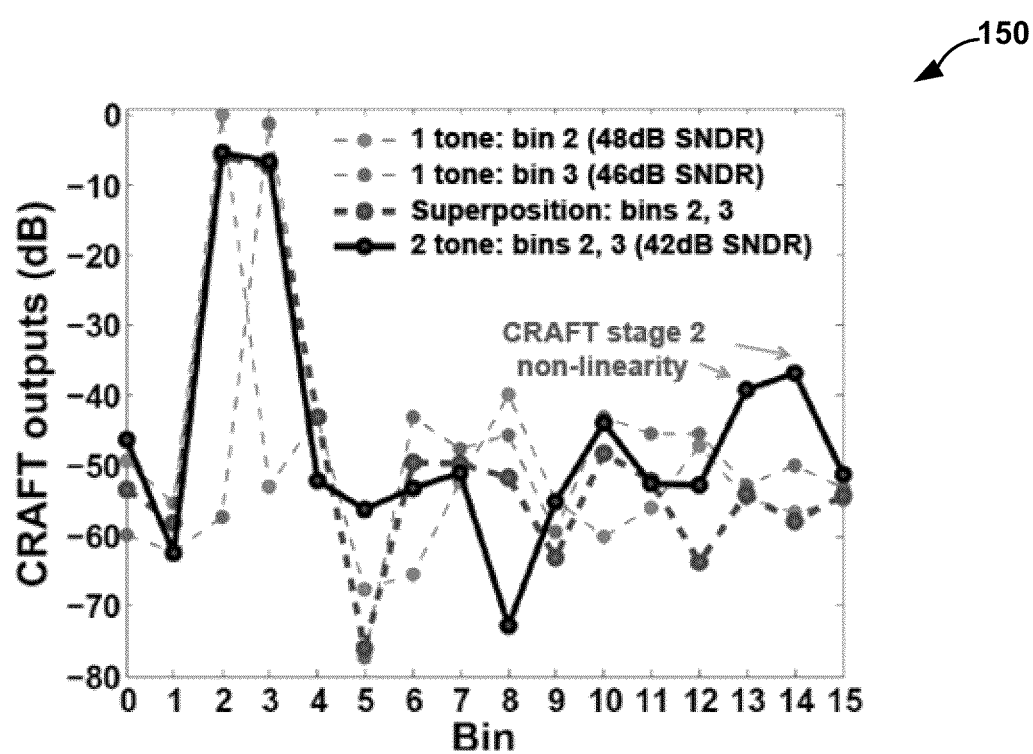
FIG. 12 is a graph illustrating a two-tone non-linearity test on CRAFT implemented in accordance with the techniques described in this disclosure.

FIG. 12 is a graph 150 illustrating a two-tone non-linearity test on CRAFT implemented in accordance with the techniques described in this disclosure. The x-axis denotes bins in graph 150 while the y-axis denotes CRAFT outputs (in decibels or dB). That is, results from a two-tone test with tones on adjacent bins are shown in the example of FIG. 10. Two single-tone measurements and their superposition (adjusted to the sampler input full-scale) are also shown. The difference between the superposition and the measured two-tone output may be indicative of the additional non-linearity introduced. The relative increase in bins 13 and 14 may be due to uncorrected twiddle factor errors in stage 2 of the CRAFT engine.

Figures 13, 14:
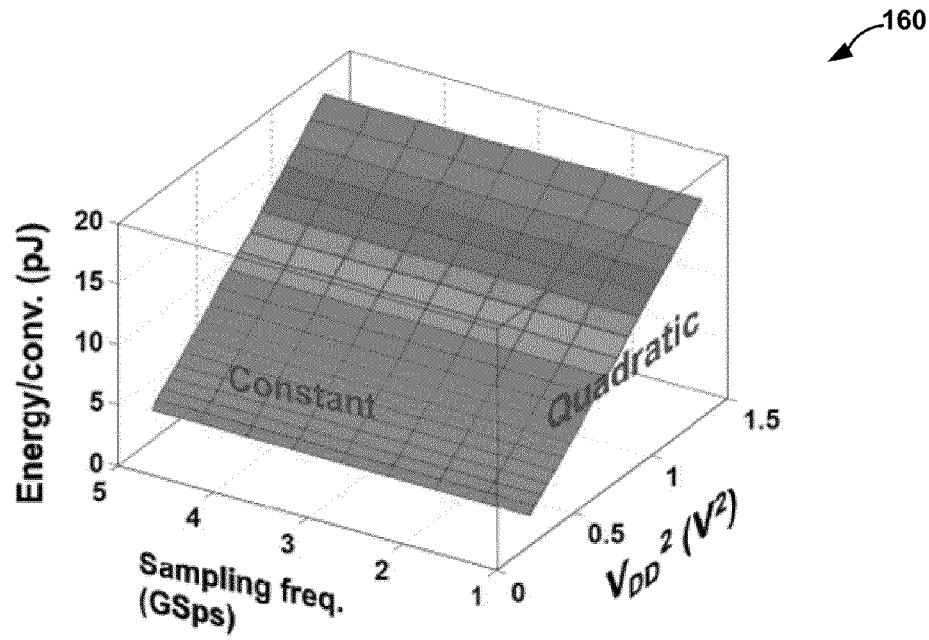
FIG. 13 is a graph illustrating a digital-like energy relation with $f_{samp}$ and $V_{DD}$ of CRAFT implemented in accordance with the techniques described in this disclosure.
FIG. 14 is a table that compares performance of CRAFT as implemented in accordance with the techniques described in this disclosure with one digital and two analog-domain FFT implementations.

FIG. 13 is a graph 160 illustrating a digital-like energy relation with $f_{samp}$ and $V_{DD}$ of CRAFT implemented in accordance with the techniques described in this disclosure. The x-axis denotes VDD in graph 160 while the y-axis denotes sampling frequency (in Gigasamples per second or GSps) and the z-axis denotes Energy per conversion in picoJoules (pJ). As depicted in the example of FIG. 11, measurements show the expected digital-like relationship of the CRAFT energy with frequency and supply voltage. As a result, CRAFT may respond favorably to technology scaling.

This disclosure describes a wideband ultra-low power RF frontend channelizer incorporating a 16 point FFT. The CRAFT design is based on charge re-use, enabling this design to run at speeds of 5 GS/s with a 47 dB SNDR, while consuming only 12.2 pJ/conv.

FIG. 14 is a table 170 that compares performance of CRAFT ("This work") as implemented in accordance with the techniques described in this disclosure with one digital and two analog-domain FFT implementations. As shown, for comparable SNDR values, CRAFT operates at speeds potentially 5× faster than previous state-of-the-art designs. Additionally, CRAFT may consume better than 28× lower energy. As an RF channelizer, CRAFT may reduce digitization requirements enabling wide-band digital spectrum sensing. As a result, CRAFT may help advance the state-of-the-art for wide-band SDR architectures.

Figure 15:
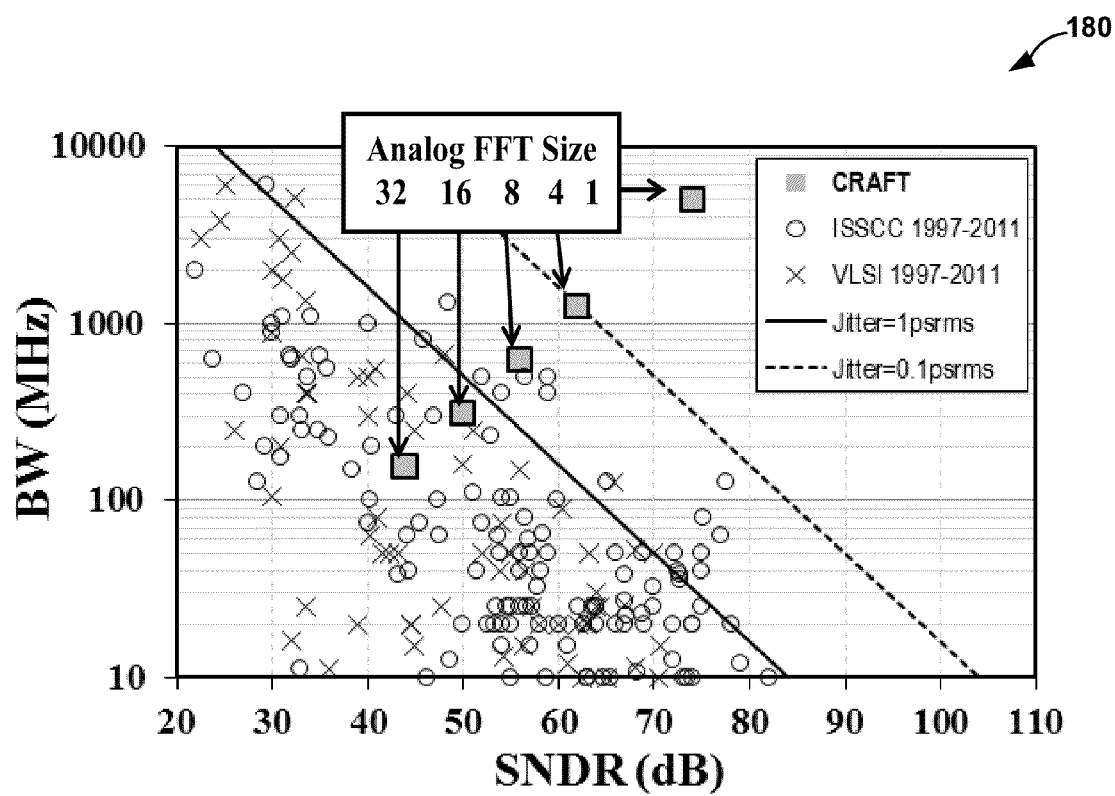
FIG. 15 is a graph illustrating feasibility of analog-to-digital converters (ADCs) versus bin size of the CRAFT front-end.

FIG. 15 is a graph 180 illustrating feasibility of analog-to-digital converters (ADCs) versus bin size of the CRAFT front-end, where the x-axis in graph 180 denotes output signal-to-noise and distortion ratio (SNDR) while the y-axis denotes sampling bandwidth (BW) in megahertz (MHz). In other words, impact of the CRAFT front-end, as implemented in accordance with the techniques of this disclosure, on the ADC requirements is shown in the example of FIG. 15. As noted above, the CRAFT front-end may bring the required ADC specification from infeasible (top-right corner of graph 180) toward being achievable (bottom left half of graph 180), potentially helping to solve the broad-band digitizing problem to enable, as one example, the realization of wide-band SDRs.

While described above with respect to a passive analog charge re-use linear transform circuit, the techniques may be performed by any analog linear circuit that may act as a channelizer to provide channelization prior to application of analog-to-digital conversion (ADC). In this respect, the techniques may generally enable transformation of an analog input signal with an analog linear transform circuit to generate a transformed analog signal; and output of the transformed analog signal with the analog linear transform circuit to one or more (and possibly a bank of) analog-to-digital converter (ADC) units. By employing this analog linear transform, such as an FFT, in front of the one or more ADCs, the ADC requirements may be reduced from the reduction in dynamic range of the ADCs that result from frequency domain channelization. In one example, the analog linear transform circuit may comprise a passive analog charge re-use linear transform circuit, which may be represented in this disclosure by the CRAFT unit. In other examples, the analog linear transform circuit may comprise active analog linear transform circuits that have active components for, as one example, converting from the voltage to the charge domain. In some other examples, the analog linear transform may not operate in the charge-domain. Instead, in these examples, the analog linear transform may operate in the current domain. Examples of the analog linear transform circuit may include one of an analog Fourier transform, an analog discrete Fourier transform and an analog fast Fourier transform.

Beamforming

The CRAFT unit disclosed in the present disclosure, such as CRAFT unit 12 shown in FIG. 1 and FIG. 2, may also be used in the context of spatial-spectral beamforming. In accordance with some aspects of the present disclosure, a spatio-spectral beamforming architecture that exploits diversity in frequency and in space (in that order) is disclosed herein. The spatio-spectral beamforming architecture may include an analog integrated spatio-spectral beamforming front-end that allows for accurate beam steering of signals with large fractional bandwidths, thereby minimizing beam squinting, and that further allows for simultaneous and independent steering of multi-carrier signals. The analog integrated spatio-spectral beamforming front-end may use an analog fast Fourier transform (FFT) that is capable of multiple and simultaneous beam-steering directions per frequency bin. In some examples, the analog FFT used by the analog integrated spatio-spectral beamforming front-end may be the CRAFT unit 12 shown in FIG. 1 and FIG. 2. While described with respect to FFT in the examples below, the techniques may be performed with respect to any transform capable of transforming signals from a spatial domain to a frequency domain.

Figure 16A:
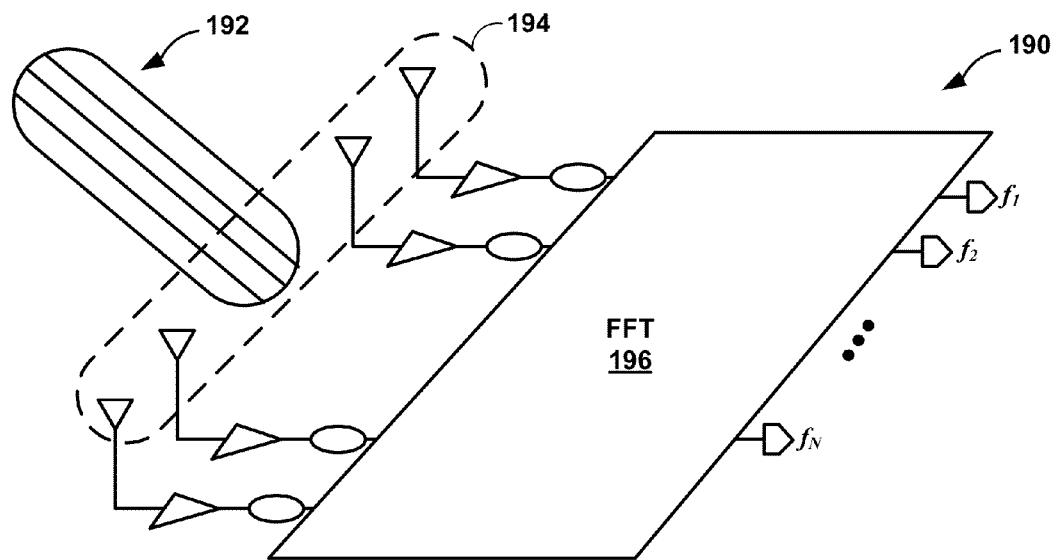
FIGS. 16A and 16B are block diagrams illustrating a conceptual spatio-spectral beamforming front end according to some aspects of the present disclosure.
Figure 16B:
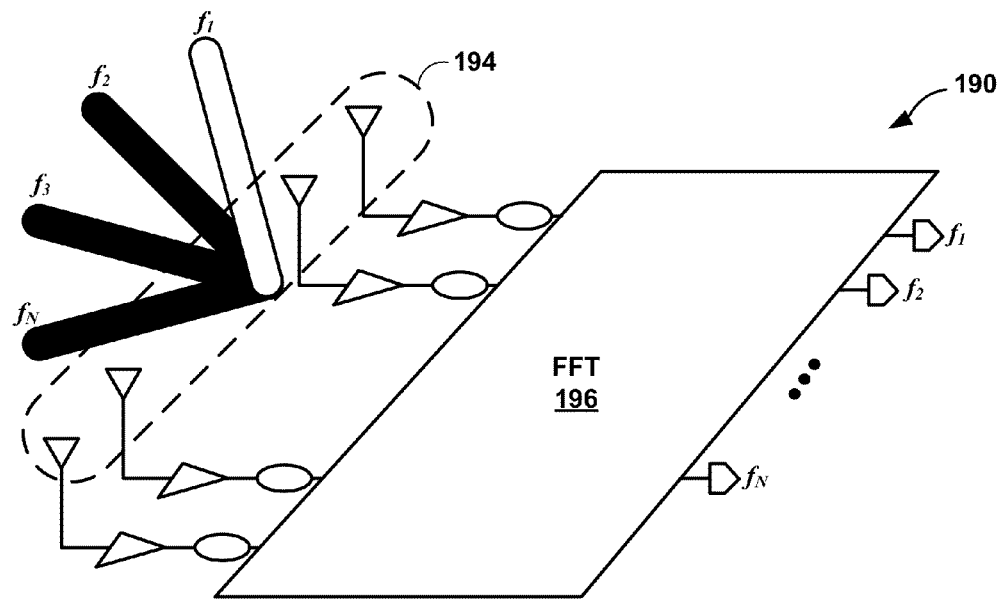

In some examples, spatio-spectral beamforming architectures may allow for accurate beam steering of signals with a large fractional bandwidth. FIGS. 16A and 16B show a block diagram illustrating a conceptual spatio-spectral beamforming front end according to some aspects of the present disclosure. As shown in FIG. 16A, spatio-spectral beamforming front end 190 may receive wideband signal 192 via antennas 194 having M channels and may split wideband signal 192 that is in the time domain into smaller frequency slices $f_1$-$f_N$ in the frequency domain using analog FFT 196 included in spatio-spectral beamforming front end 190. A spatio-spectral beamformer that includes spatio-spectral beamforming front end 190 may steer each frequency slice $f_1$-$f_N$ in the same direction. Such frequency splitting may significantly reduce bean squinting for wideband phased arrays.

A space-only phased array filter may filter the signals only in the spatial domain either through time-delay circuits or phase shifters. Because all electromagnetic waves travel at the same speed in a medium, all electromagnetic waves may suffer the same progressive time delays in arriving at different points in an antenna array. Since the phase shift is directly proportional to the frequency, $2\pi f\tau$, for a given time delay $\tau$, phase shifters-based phased arrays may be inherently narrow-band because they apply a constant phase shift to the entire spectrum. To deal with signals having large fractional bandwidths, $$f_{frac} = 2\frac{f_{max} - f_{min}}{f_{max} + f_{min}},$$

an on-chip constant group-delay circuit may be needed. In some examples, those circuits have been implemented using true time delay circuits based on LC approximation of a transmission line or using all-pass delay circuits.

It may be possible to accomplish the same using phase shifter-based approaches. In phase shifter-based approaches, large $f_{frac}$ signals may be accurately steered by slicing them in frequency and having a dedicated phase shifter per frequency slice. If analog FFT 116 is an N-point FFT, then analog FFT 196 may act as a frequency discriminator to slice wideband signal 192 into N equal parts $f_1$-$f_N$ and each frequency slice may be processed by a dedicated phase shifter (not shown) in the spatio-spectral beamformer.

Figure 17:
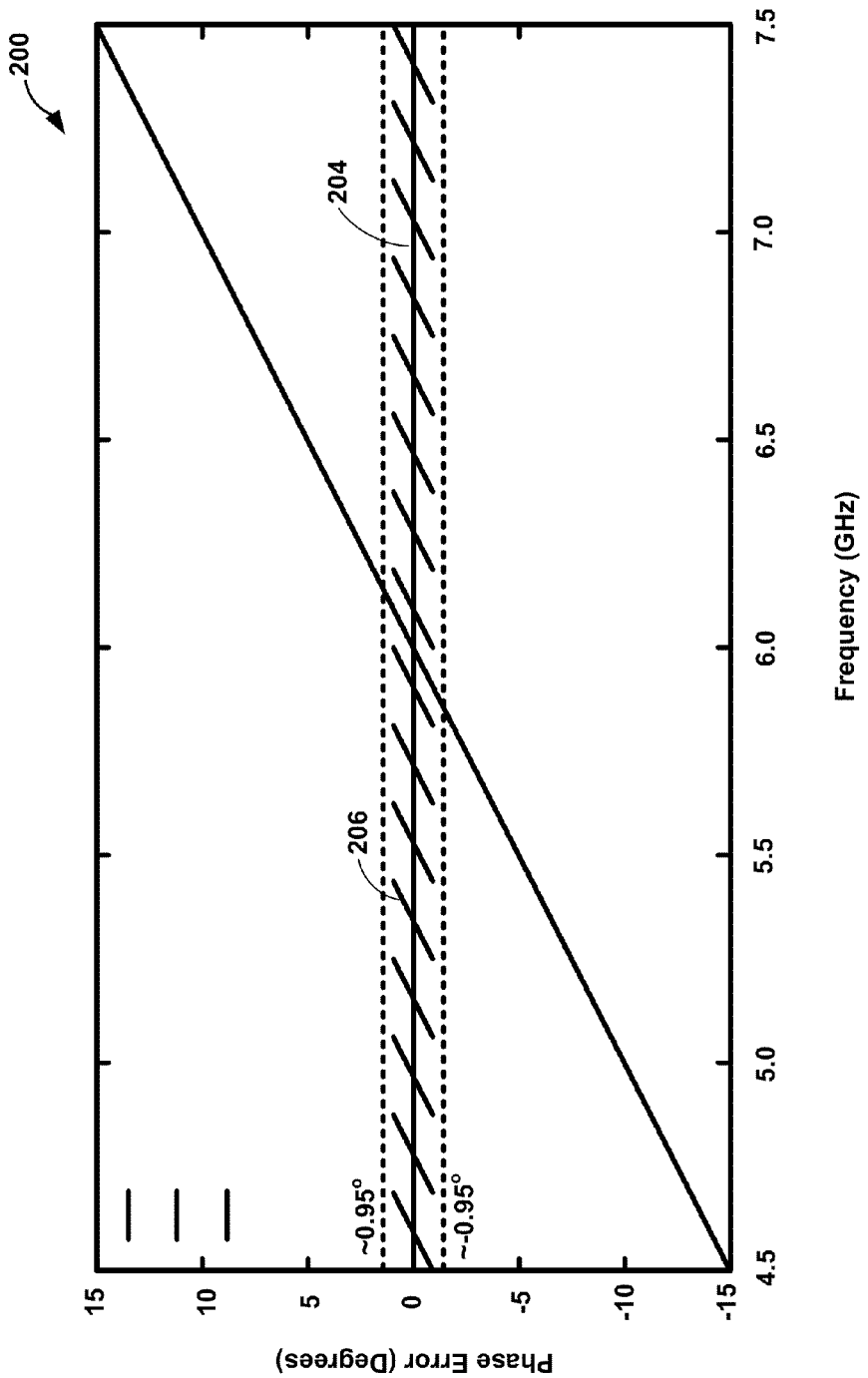
FIG. 17 is a diagram that illustrates phase error vs. frequency for a system with a carrier frequency of 6 GHz and a fractional bandwidth of 0.5 according to some aspects of the present disclosure.

The accuracy of beam-steering may be proportional to the number of frequency slices, a phase shift corresponding to the center of a frequency slice may be applied for each frequency slice. Thus, the maximum phase error for a frequency slice is $2\pi \Delta f_{slice} \tau$, where $\tau$ is a time delay and where $\Delta f_{slice}$ is half of the frequency slice width. FIG. 17 is a diagram that illustrates phase error vs. frequency for a system with a carrier frequency of 6 GHz and a fractional bandwidth of 0.5 according to some aspects of the present disclosure. As shown in FIG. 17, graph or plot 200 includes a linear slope 202 demonstrating phase error (in degrees) over frequency (in gigahertz (GHz)), where slope 202 may represent the phase error when a fixed phase shift (60°) corresponding to the center frequency is applied across the entire spectrum. As shown by slope 202 of plot 200, a maximum phase error of 15° may occur at the extreme ends at about 4.5 GHz and about 7.5 GHz. Line 204 may correspond to a true time delay circuit. Since all frequencies may be affected by equal time delays, there may not be any phase errors when using a true time delay. The band of lines 206 may correspond to the phase error when the signal spectrum is split into 16 equal slices. A phase shift corresponding to the center frequency of the slice may be applied across the entire slice. The maximum phase error, post spectral slicing, may be about 0.95°. The phase error may decrease by sixteen times.

Spatio-spectral beamforming front end 190 may also enable communications and/or multi-target illumination where beams may be independently and concurrently steered, so that multiple frequencies may be used simultaneously for phased array communications. This may enable multi-carrier communications where each carrier may be independently beam-steered. As shown in FIG. 16B, in a multi-carrier scenario, antenna elements 194 may receive a multi-carrier beam. FFT 196 may slice the received beam into a plurality of frequency slices, where each carrier and its associated modulation may be considered a different frequency slice. Each frequency slice may be steered concurrently in a different direction independent of the other frequency slices via, for example, a phase shifter (not shown).

Spatio-spectral beamforming front end 190 may also suppress blockers in both spatial and spectral domains. In some examples, the spatio-spectral beamforming front end 190 may include a dedicated phase shifter for each frequency slice, so that each frequency slice can be independently and simultaneously steered in any direction in a multi-carrier scenario. The spatio-spectral beamforming architecture may achieve blocker suppression by steering a particular frequency beam away from another beam at that frequency. Blocker frequency beams at a different frequency but incidental to the direction of a particular frequency beam may also be avoided via steering that particular frequency beam.

Spatio-spectral beamforming front end 190 may also reduce ADC dynamic range requirements and, consequently, ADC power, by virtue of analog channelization and spatio-spectral blocker nulling. Due to the suppression of blockers and due to the channelization of signals prior to digitization, the constraints on ADCs in the spatio-spectral beamforming architecture may be significantly relaxed. Eliminating blockers may reduce the ADC dynamic range. Furthermore, frequency channelization due to the analog FFT may reduce the peak to average power ratio across each frequency slice, thereby leading to lower dynamic range requirements for ADCs.

In Intermediate Frequency (IF) beamforming, both filtering and beamforming may be performed entirely in the digital domain, which may relax the dynamic requirements of ADCs. Phase-shifting at IF may reduce sensitivity to circuit parasitics and may improve inter-element matching. Typically, for large fractional bandwidths with M channels and N frequency bins where N≥M, IF beamforming may be preferable for a spatio-spectral beamforming architecture. For example, in an ultra-wideband scheme, where frequency diversity may be important for performance, IF beamforming may be used to address a 3-10 GHz band signal using a four antenna frontend with sixteen frequency slices (440 MHz/slice) to perform phased array beamforming.

In accordance with some aspects of the present disclosure, an analog FFT engine applying the same techniques as the CRAFT unit 12 shown in FIGS. 1 and 2 may be used as the frequency discriminator for the spatial-spectral beamforming front end 190 that performs IF beamforming. The output bins (i.e., frequency slices) of the CRAFT unit 23 may be processed by a vector-combiner for phase shifting. The spatial-spectral beamformer may include a CRAFT unit 23 per element and one vector-combiner per output bin (i.e., frequency slice) of the CRAFT units 23.

An N-point FFT, such as the CRAFT unit 12 shown in FIGS. 1 and 2, may take as input N sampled time domain inputs and may output N discrete frequency domain values in N output bins. Each of the N outputs may have a sin c-like magnitude representation in the frequency domain. Each of the N output bins may be centered at $$k \frac{f_s}{N},$$

where $f_s$ is the sampling rate for the output and k is the bin number. Assuming that the input to the system is a pure sinusoid at frequency f that is sampled at a rate of $f_s$, the following equation can be written for k-th output X given input x[i]

$$X_k = \sum_{i=0}^{N-1} x[i] e^{-j\frac{2\pi i k}{N}} \quad (7)$$

$$x[i] = e^{j\frac{2\pi i f}{f_s}}$$

$$X_k(f) = e^{-j(N-1)\pi\left(\frac{k}{N} - \frac{f}{f_s}\right)} \left( \frac{\sin\left(N\pi\left(\frac{k}{N} - \frac{f}{f_s}\right)\right)}{\sin\left(\pi\left(\frac{k}{N} - \frac{f}{f_s}\right)\right)} \right)$$

$$|X_k(f)| = \frac{\sin\left(N\pi\left(\frac{k}{N} - \frac{f}{f_s}\right)\right)}{\sin\left(\pi\left(\frac{k}{N} - \frac{f}{f_s}\right)\right)}.$$

Equation (7) shows that each output bin of the FFT may behave like a sin c filter. Because the FFT may be preceded by an anti-alias filter, analyzing equation (7) in $$\left[-\frac{f_s}{2}, \frac{f_s}{2}\right]$$

may be sufficient.

Figure 18:
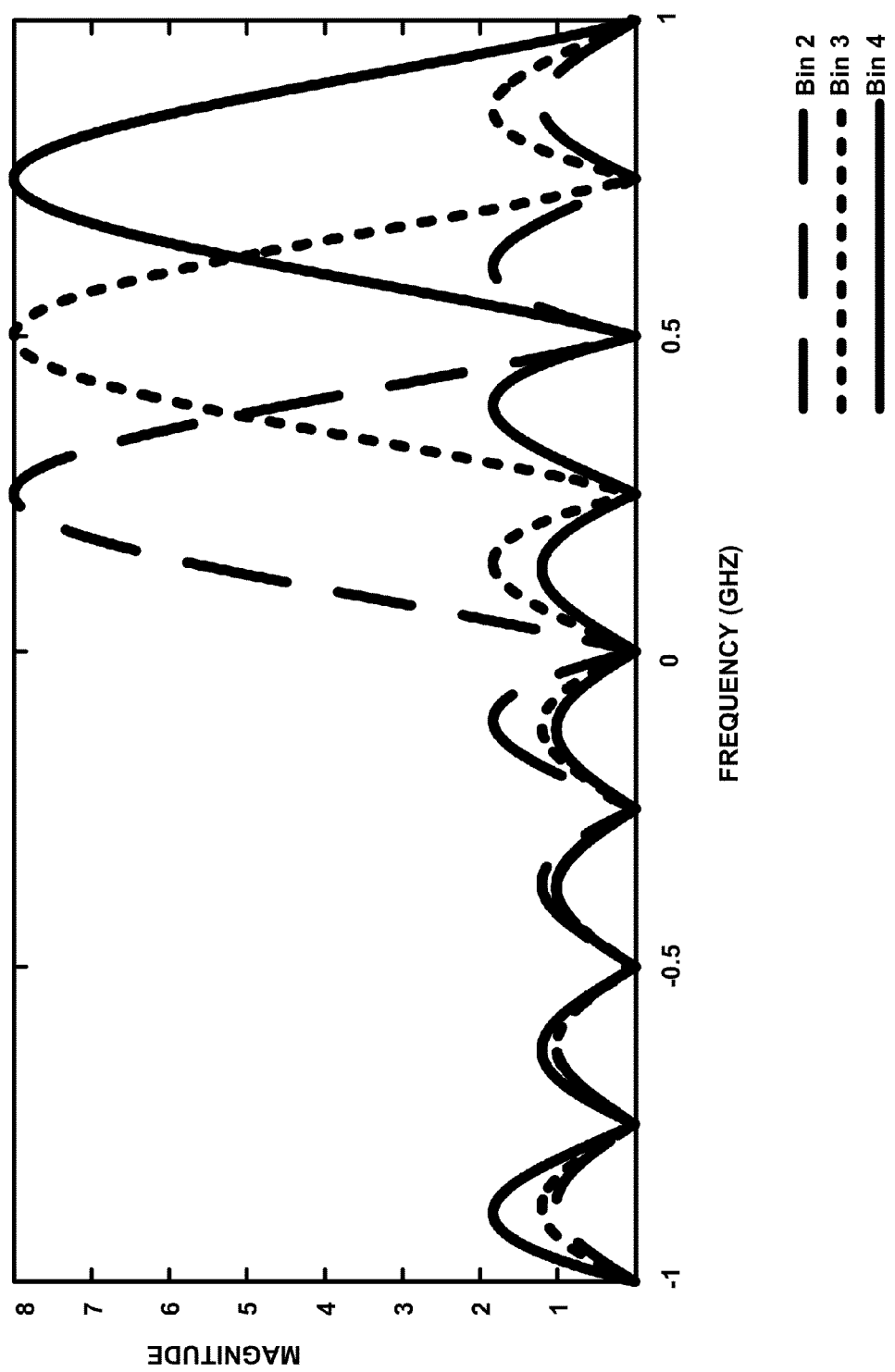
FIG. 18 is a diagram illustrating the output of an 8-point FFT sampled at 2 GS/s according to some aspects of the present disclosure.

FIG. 18 is a diagram illustrating the output of an 8-point FFT sampled at 2 GS/s according to some aspects of the present disclosure. As shown in FIG. 18, according to equation (7), each output of an N-point FFT is a complex filter centered at $$k\frac{f_s}{N}, k \in \left[-\frac{N-1}{2}, \frac{N-1}{2}\right].$$

The qualify factor Q of the filter, where $$Q = \frac{f_{center}}{f_{3dB}},$$

may be given by $$\frac{k}{-0.89}$$

Figure 19:
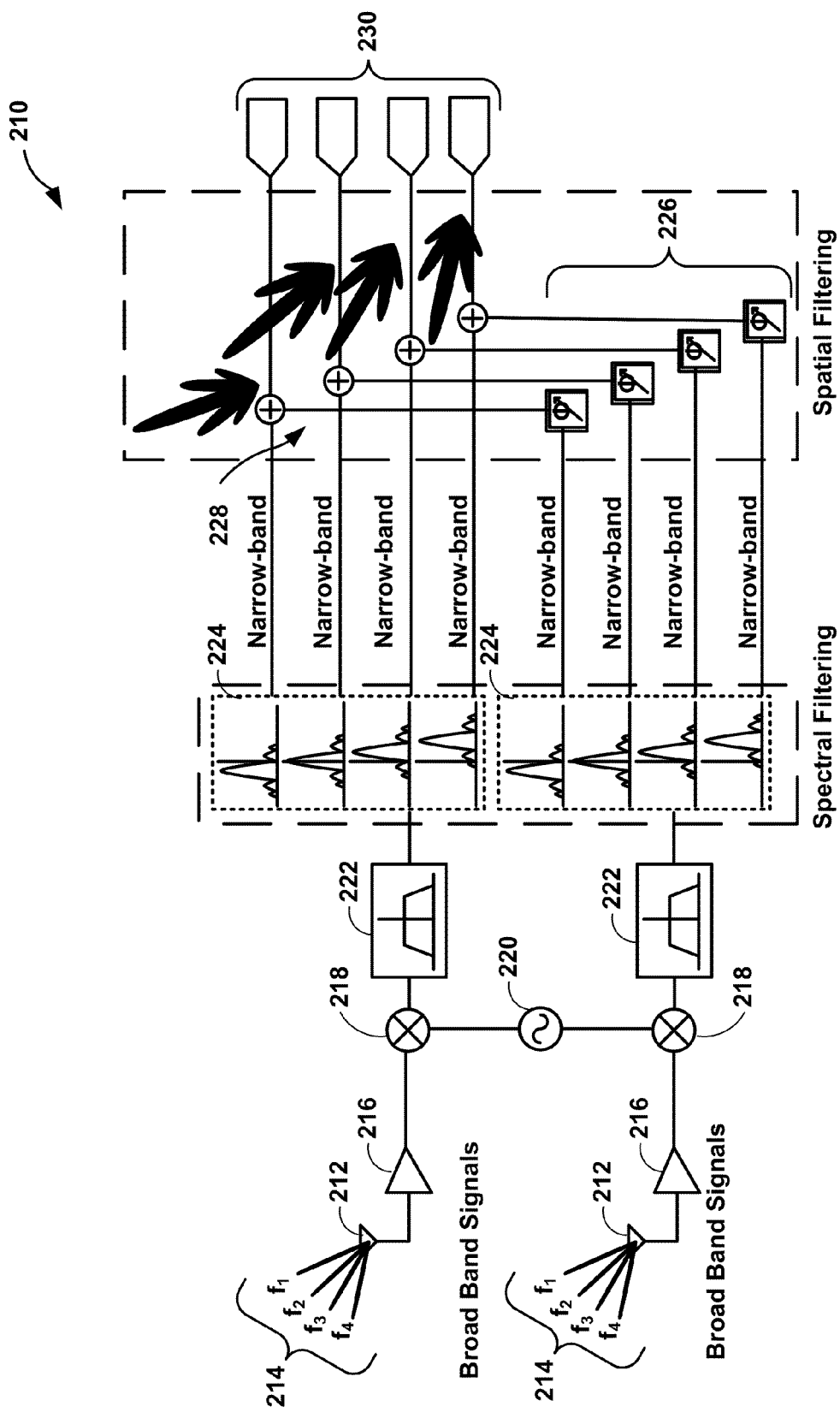
FIG. 19 is a block diagram illustrating a two-channel four-beam spatial-spectral beamforming architecture according to some aspects of the present invention.

A spatio-spectral beamformer may filter signals in spectrum and in space. FIG. 19 is a block diagram illustrating a two-channel four-beam spatial-spectral beamforming architecture according to some aspects of the present invention. The beamforming architecture, which is embodied by exemplary beamformer 210, may first spectrally filter broadband signals and then spatially process those signals. In the absence of blockers, the signals on each output bin of the FFT can be steered in any direction. As shown in FIG. 19, beamformer 210 may include antenna elements 212 that receive RF signals 214. Amplifiers 216 may amplify RF signals 214. Mixers 218 may receive amplified RF signals 214 as well as I and Q channel linear oscillating signals from oscillator 220 and may output IF signals. CRAFT units 222, similar to CRAFT unit 12 shown in FIGS. 1 and 2, that perform charge-based discrete Fourier transforms may receive the IF signals output by mixers 218 and may spectrally filter the received IF signals into narrowband frequency slices 224. Narrowband signals from one of the CRAFT units 222 may be phase shifted 226 and combined 228 with unshifted narrowband signals from the other narrowband signals of the CRAFT units 222 to spatially filter the IF signals. The spectrally and spatially-shifted signals may be output to ADCs 230 that converts the analog signals to digital signals.

Figures 20A, 20B:
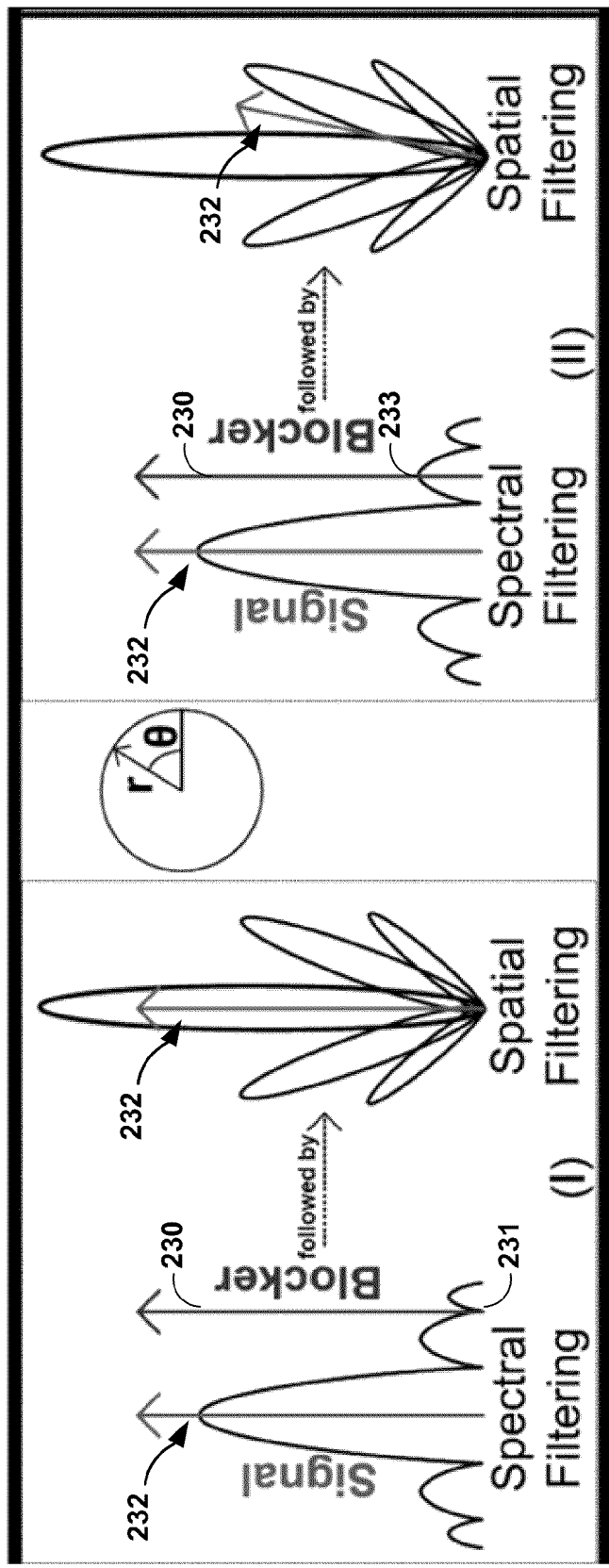
FIGS. 20A and 20B are diagrams illustrating spectral filtering and spatial filtering according to some aspects of the present disclosure.

Even in the absence of blockers, a spatio-spectral beamforming scheme may leverage a second degree of freedom by means of spectral filtering on top of spatial filtering. As suggested by equation (7), any signal, except for signals at multiples of $f_s/N$, is present on multiple output bins. FIGS. 20A and 20B are diagrams illustrating spectral filtering and spatial filtering according to some aspects of the present disclosure. As shown in FIG. 20A, blocker 230 may fall near the null 231 of an FFT (spectral) sync signal 232 and thus is severely attenuated. The attenuation of the blocker allows a spatio-spectral beamformer, such as beamformer 210, to steer the signal 232 in the broadside direction via spatial filtering, thereby maximizing the signal amplitude. As shown in FIG. 20B, the blocker 230 falls in the vicinity of an on-bin signal 233 and thus does not suffer any significant attenuation. As a result, a spatio-spectral beamformer such as beamformer 210 may steer the signal off the broadside to spatially eliminate the blocker.

In general, any signal may be partially spectrally filtered. Whether the block is to be completely eliminated or whether the signal is steered to broadside may depend on the extent of this spectral filtering. On the one hand, only the signal and noise may remain (SNR metric) with post-signal combining. On the other hand, a residual blocker noise may corrupt a stronger signal (SINR metric). Whether to eliminate the blocker completely or to steer the signal to broadside may be based on the frequency of the blocker.

To compare the two options, let $\theta_{sig}$ and $\theta_{blk}$ be the progressive phase shifts of the signal and the blocker at the antenna array, respectively. The signal is assumed to be on-bin. Further, let $f_b$ be the blocker frequency and let A be the blocker amplitude normalized to the signal. Then an equation may be written as $$\alpha^2 = \frac{\sin^2(M(\theta_{sig} - \theta_{blk}))}{\sin^2\left(\theta_{sig} - \theta_{blk} + \frac{2\pi}{M}\right)} \quad (8a)$$

$$\gamma^2 = A^2 |X_k(f_b)|^2 \frac{\sin^2(M(\theta_{blk} - \theta_{sig}))}{\sin^2(\theta_{sig} - \theta_{blk})} \quad (8b)$$

$$SNR = \frac{\alpha^2}{\sigma^2} \quad (8c)$$

$$SINR = \frac{M^2}{\sigma^2 + \gamma^2} \quad (8d)$$

Equations (8a-8d) suggest that if $\gamma$ is small enough, then SINR may generally be higher than SNR, but it may not be true for all bins. The bins that have a significant presence of blockers may have to resort to blocker cancellation in the spatial domain (i.e., the SNR option). However, since space-only phased arrays may always exercise the SNR option, a composite filtering approach of space and frequency may provide the same SNR or a better SINR.

Figure 20C:
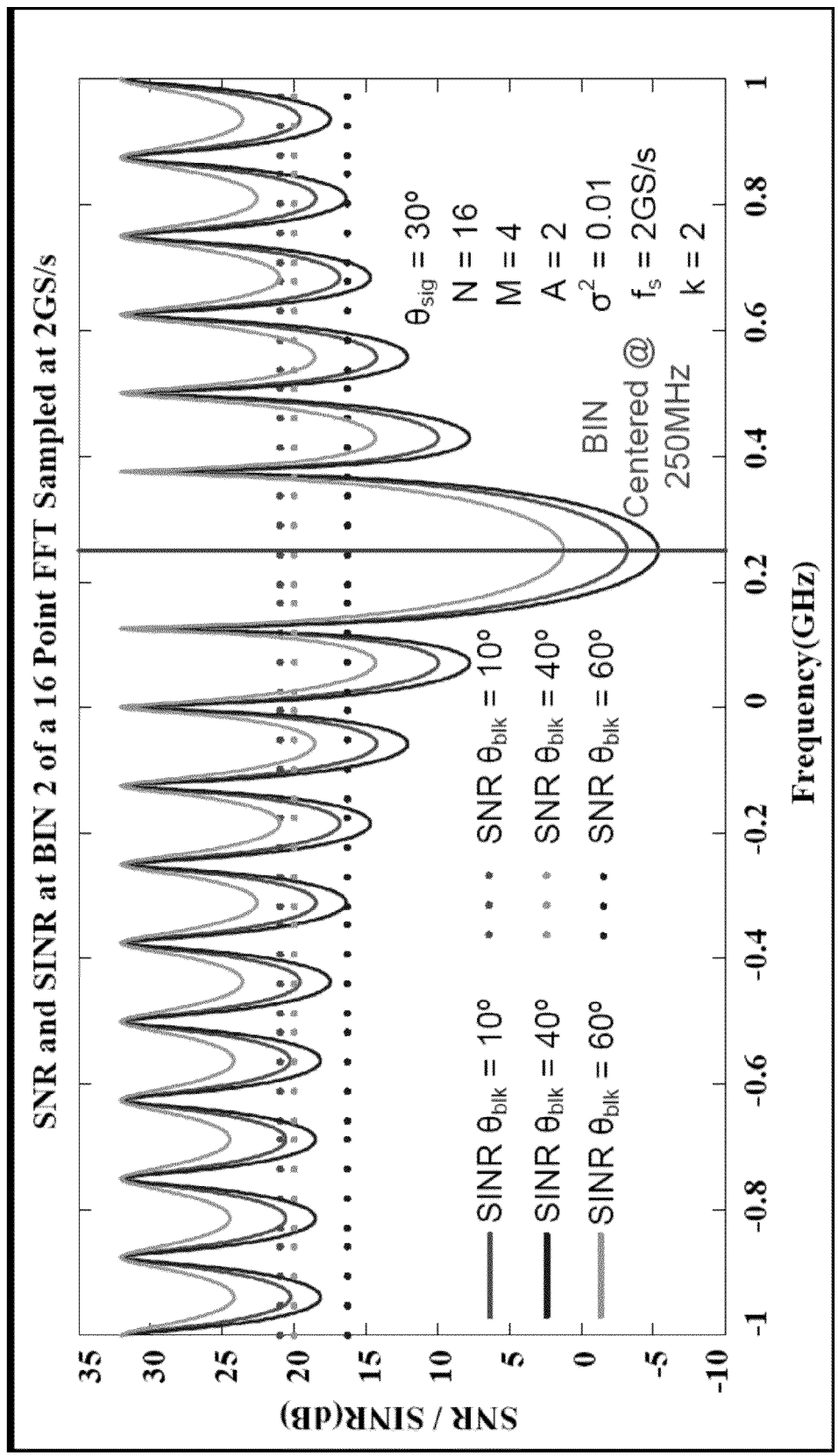
FIG. 20C is a diagram showing the SNR and SINR output on bin 2 of a 16-point FFT sampled at 2GS/s according to some aspects of the present disclosure.

FIG. 20C is a diagram showing the SNR and SINR output on bin 2 of a 16-point FFT sampled at 2 GS/s according to some aspects of the present disclosure. As shown in FIG. 20C, the signal is assumed to be on=bin (250 MHz) while the blocker frequency is swept across the sampling frequency range (2 GHz). A noise level of $\sigma^2=0.01$ and a blocker level of A=2 may be assumed. A 4-element (4-channel) front-end is assumed. For blockers in the vicinity of the signal, complete blocker elimination may be preferable as it may give a higher SNR. For blockers farther away from the signal, steering the beam to broadside may provide a higher SINR. The scheme shown in FIG. 20C may allow a full array gain (e.g., SINR at about 32 dB for 4 elements) to be achieved even in the presence of a blocker. For the cases in FIG. 20C, the best case improvement may be 17 dB while the worst case may be 0 dB. In extreme cases where there is a well-spread broadband blocker, it may be necessary to eliminate the blockers using spatial filtering. However, even in this case, spectral filtering provides an N-fold improvement in beam-steering accuracy as well as blocker nulling due to the beamforming architecture's large $f_{frac}$ handling capability.

The switched capacitor setup used to realize the analog FFT in the CRAFT unit 222 may also be used to realize a phase shifter by treating time synchronous (i.e., parallel) samples from the different antenna elements as time asynchronous (i.e., sequential) samples from a single antenna element. For a spatial-spectral beamforming system with M elements and an N-point FFT, N≥M, expanding the expression for the output $X_k$ of the $k^{th}$ bin of an N-point FFT may yield the equation $$X_k = x[0] + x[1]e^{jk\theta} + \ldots + x[N-1]e^{jk(N-1)\theta}, \quad (9)$$

where $$\theta = \frac{2\pi}{N}$$

By denoting the input sample from the $i^{th}$ element, at time $nT_s$, by $x[i]_{nT_s}$ and replacing the x[i]'s, i∈[0, M−1] in (9) with $x[i]_{nT_s}$, and by setting x[i]=0 for i∈[M, N−1], we have $$X_k[nT_s] = \sum_{i=0}^{M-1} x[i]_{nT_s} e^{ji\theta} \quad (10)$$

Equation (10) may be recognized as the output of a beamformer, such as beamforming device 210, in discrete time. A progressive phase shift of θ has been applied to each concurrent sample from M channels. Note that the summation index in (10) runs until M and not until N, while the index k runs from 0 to N−1, thereby corresponding to progressive phase shifts of 0 to (N−1) θ with a phase shift resolution of θ.

A potential advantage of an FFT-based phase shifter may be the simultaneous availability of multiple beams in different directions per frequency bin. An N-point FFT as a spectral filter followed by an N-point FFT as a phase shifter may give a total of $N^2$ beams with N beams per output bin of the spectral FFT. A single transceiver block may thus resolve multiple carrier signals in multiple directions using this scheme.

Figure 21:
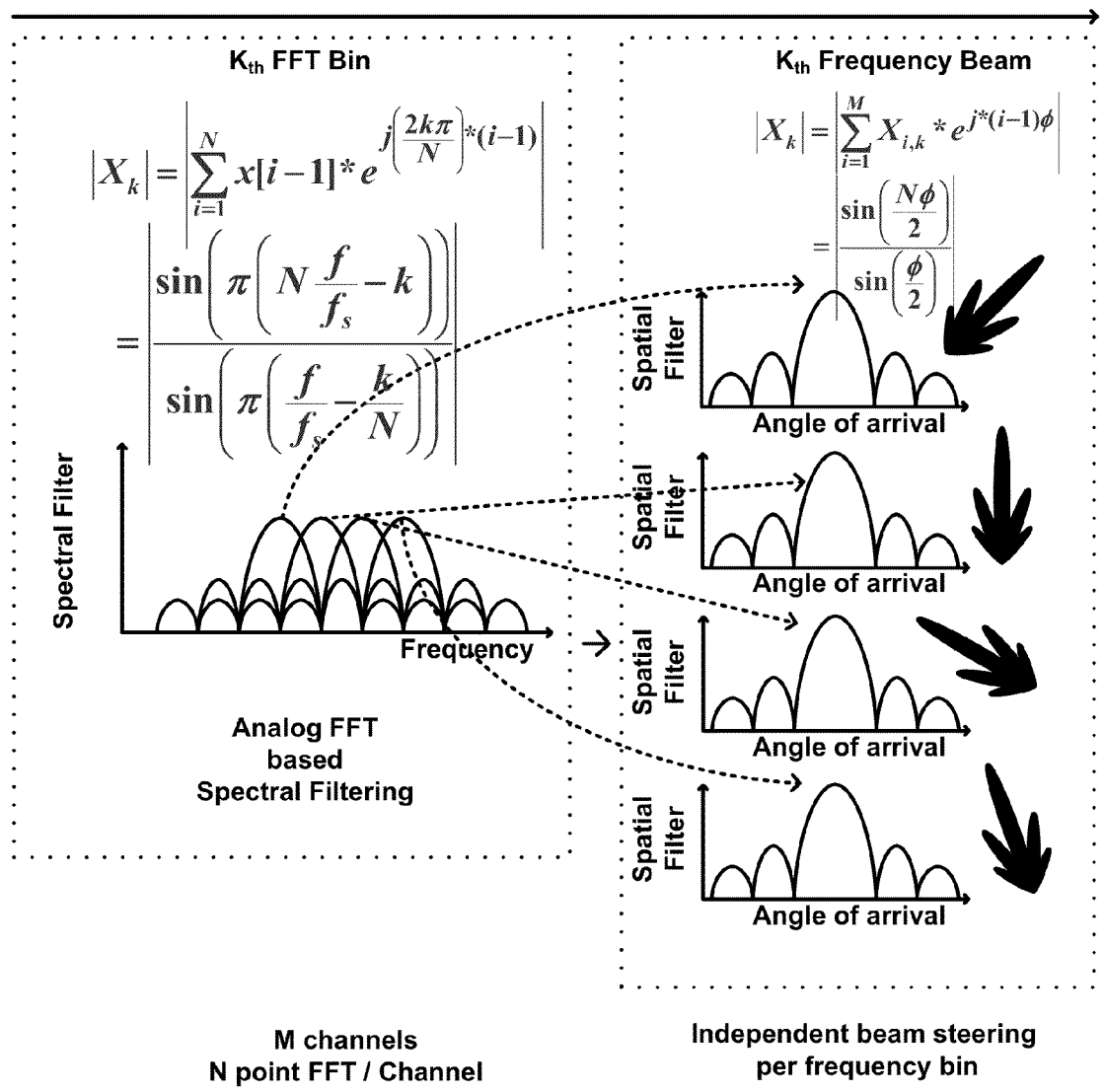
FIG. 21 is a signal processing chain according to some aspects of the present disclosure.

FIG. 21 is a signal processing chain according to some aspects of the present disclosure. As shown in FIG. 21, there are M sin c (spectral) filters and N sin c (spatial) filters for an M-cannel, N-point FFT-based spatio-spectral beamformer. Because both spectral and spatial filtering are sin c in nature, the same low-power charge-based CRAFT units, such as CRAFT unit 12 shown in FIG. 1 and FIG. 2, may be used for both spectral filtering and spatial filtering.

Figure 22:
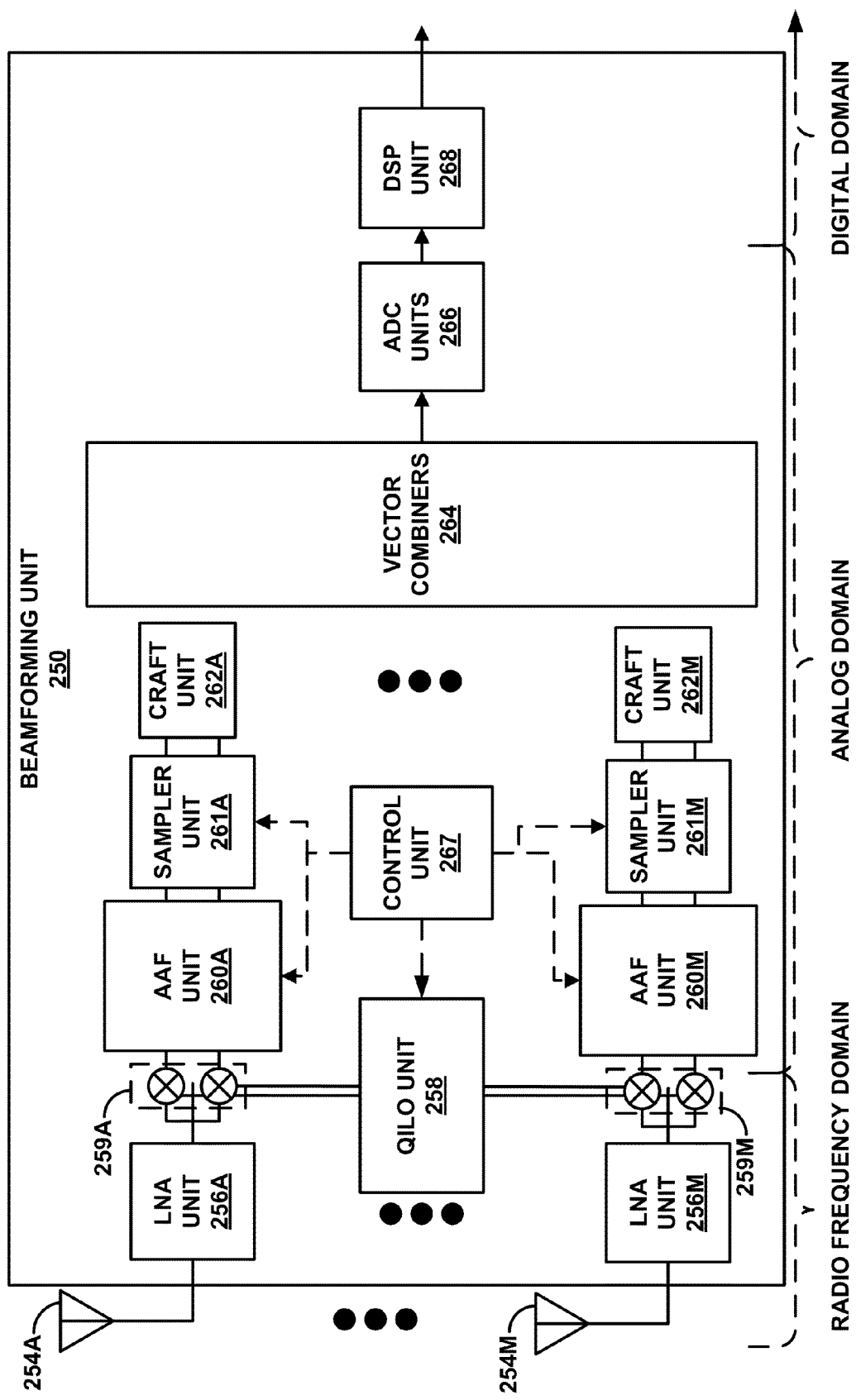
FIG. 22 is a block diagram illustrating a multi-beam spatial-spectral beamforming unit that includes a charge re-use analog Fourier transform (CRAFT) radio frequency (RF) front-end unit that performs the techniques described in this disclosure.

FIG. 22 is a block diagram illustrating a multi-beam spatial-spectral beamforming unit that includes a charge re-use analog Fourier transform (CRAFT) radio frequency (RF) front-end unit that performs the techniques described in this disclosure. As shown in the example of FIG. 22, beamforming unit 250 includes antennas 254A-254M ("antennas 254"), low noise amplifier (LNA) units 256A-256M ("LNA units 256") each coupled to one of antennas 254, a quadrature injection locked oscillator (QILO) unit 258, I/Q mixer units 259A-259M ("I/Q mixers 259"), Anti-aliasing filter units 260A-260M ("AAF units 260"), sampler units 261A-261M ("sampler units 261"), CRAFT units 262A-262M ("CRAFT units 262"), vector combiner units 264, analog-to-digital converter (ADC) units 266, a digital signal processor (DSP) unit 268, and a control unit 267. Reference to units or modules in this disclosure may refer to hardware or a combination of hardware and software. In some instances, each of the units may be implemented as dedicated hardware or a combination of dedicated hardware and software. In other instances, two or more units may be implemented as a combined unit, sharing hardware, which may in some instances also execute software (in the form of instructions). Reference to individual units may therefore refer to functional operations and may not denote the underlying implementation or structure.

Antennas 254 may represent any type of antenna capable of receiving RF signals. LNA units 256 may be operably coupled to antennas 254 and may represent a unit that is used to amplify possibly weak signals captured or received by antenna 254. QILO unit 258 may represent a control system that generates I and Q channel linear oscillating (LO) signals. Control unit 267 may feed an injection signal to QILO unit 258. I/Q mixer units 259 may represent units that perform frequency translation from RF to baseband frequency (which may also be referred to as an intermediate frequency (IF)).

AAF units 260 may represent a filter that may be varied or configured to restrict bandwidth of a signal. AAF units 260 may, in other words, restrict a configurable range of the bandwidth of the signal. AAF units 260 may be employed to restrict the bandwidth of a signal to given channels or ranges to permit sampling of these different bandwidth ranges or channels in order to detect whether the range or channel is currently in use or free for use in beamforming applications. Sampler units 261 may represent units that performs sampling in the analog domain to sample the anti-aliased analog signal output from AAF units 260. While shown as separate units in the example of FIG. 22, at least some operations of AAF units 260 may be integrated within sampling units 261 to form a combined AAF/sampling unit, in some instances. For instance, sampling units 261 may integrate some AAF filtering effects, like current-domain sampling.

Each of ADC units 266 may represent a unit that converts analog signals to digital representations of the analog signals (so-called "digital signals"). More specifically, each of ADC units 266 may convert a continuous analog signal to a discrete time digital representation of the continuous analog signal. DSP unit 268 may represent a unit that performs digital signal processing on the digital signals output by each of ADC units 266. DSP unit 268 may perform any number of digital signal processing algorithms, including filtering algorithms (such as algorithms directed to causal filtering, time-invariant filtering, stable filtering, finite impulse response (FIR) filtering) and transform algorithms (such as algorithms to perform fast Fourier transforms (FFTs), discrete cosine transforms (DCTs), and discrete wavelet transforms (DWTs)).

CRAFT units 262 may perform the techniques described in this disclosure to provide an analog domain front-end frequency discriminator for beamforming unit 250. In some examples, each of CRAFT units 262 may be based on a N-point analog domain fast Fourier transform (FFT), where N may be 4, 8, 16, or any other suitable numeric value. Operations performed by CRAFT units 262 may be based on charge re-use, meaning that once sampled, the charge on a capacitor (for example) is shared and re-shared with other charge samples such that the resulting mathematical manipulation is an in-place DFT. By basing CRAFT units 262 only on toggling switches (which may be transistor gates), the low power and high speeds noted above may be enabled. Additionally, power consumed by CRAFT units 262 typically scale with frequency, supply and technology in a digital-like fashion (meaning that power consumption may be reduced as transistor fabrication technology enables faster transistor operation and decreases in transistor size).

The computations performed by CRAFT units 262 may be termed "destructive" in the sense that the input values are altered by any one operation due to the charge re-use aspect of CRAFT units 262. Consequently, CRAFT units 262 may maintain or store multiple copies of each data value so that multiple operations on the same value may be performed. To reduce the number of copies CRAFT units 262 may be required to store or otherwise maintain, CRAFT units 262 may implement a radix-2 FFT algorithm that performs the DFT with a minimum number of operations per operation per stage compared to other FFT algorithms.

To perform the FFT algorithm, CRAFTs unit 262 may sample the input signal from AAF units 260 onto one or more capacitors. To perform an FFT butterfly operation, CRAFT units 262 operate on each input twice. To perform complex operations (meaning operations on complex numbers having a real and imaginary part), CRAFT units 262 operate on each input twice. Considering that the FFT butterfly typically involves at least one complex operation involving a complex number, each of the CRAFT units 262 typically stores at least four copies of each input. Also, considering that I, Q (=2) (where I refers to in-phase signal and Q refers to a quadrature for a complex signal) and differential (=2) inputs (which refers to a signal that is represented by both positive and negative components), a 16-point FFT requires 16 (i.e., the number of points or taps) times two (complex math) times two (butterfly branches) times two (I, Q) times two (differential) for a total of 256 sampling capacitors to store the 256 copies of the inputs. More information regarding the FFT butterfly operations as performed by CRAFT units 262 is described above with respect to FIG. 3, while the layout of CRAFT units 262 is described below in more detail with respect to FIGS. 4 and 5.

In operation, beamformer unit 250 receives RF signals via antennas 254, where LNA units 256 amplify potentially weak aspects of the received RF signals. QILO unit 258 receives an injection signal from control unit 267 and operates to provide I and Q channel LO signals to I/Q mixers 259. I/Q mixers 259 may receive the RF signals from antennas 254 via LNA units 16 and may receive the I and Q channel LO signals from QILO unit 258. I/Q mixers may mix the RF signals from antennas 254 and the I and Q channel LO signals from QILO unit 258 to produce IF signals for CRAFT units 262. The IF signals produced by I/Q mixers 259 may be fed to AAF units 260, which may then perform anti-aliasing to restrict bandwidth of a signal or, in other words, select one or more channels or ranges of the received signal. AAF unit 260 may output one or more ranges or channels of the signal to sampler units 261, which samples the anti-aliased signal. Sampler units 261 may output the sampled signal to CRAFT units 262, which may as described above, store multiple copies of what may be referred to as an "input signal" (when discussed from the perspective of CRAFT unit 262). As discussed above CRAFT units 262 may include a CRAFT unit for each antenna of antennas 254. Each of the CRAFT units 262 may slice the inputted IF signals into N narrowband slices in N output bins, where each of the CRAFT units 262 may perform an N-point analog-domain FFT.

CRAFT units 262 may represent a passive analog multi-stage charge re-use linear transform circuit in that CRAFT units 262 do not require active circuit components to convert voltage values to charge values in between two or more passive charge re-use stages but instead utilizes what may be referred to as "passive" switching to switch charge values from one stage to another stage. Moreover, application of an FFT constitutes one type of linear transform and, thus, CRAFT units 262 may represent a linear transform circuit. CRAFT units 262 may output the transformed analog output signal to vector combiners 264. Vector combiners 264 may be made up of a vector combiner unit for each output bin of CRAFT units 12. Thus, for M CRAFT units 262 that each perform an N-point FFT, vector combiners 264 may comprise N*M vector combiners. Each vector combiner may perform phase shifting of the IF narrowband signals outputted by CRAFT units 262. Phase shifting in vector combiners 264 may be accomplished via passively-switched capacitor circuits similar to CRAFT unit 262. Vector combiners 264 may combine the phase shifted signals with unshifted signals and may output such combined signals to DSP 266, thereby enabling DSP unit 266 to perform beamforming operations.

Figure 23:
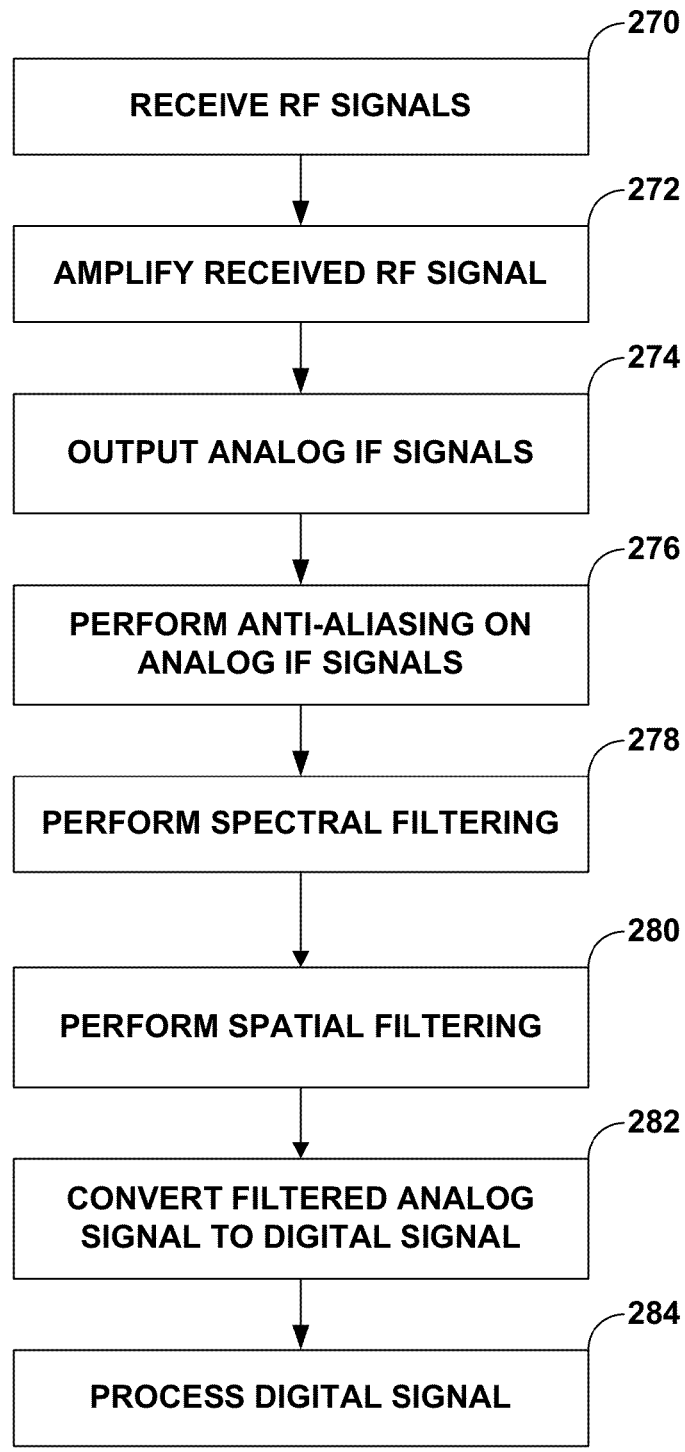
FIG. 23 is a flowchart illustrating exemplary operation of the beamforming unit shown in the example of FIG. 22 in implementing the techniques described in this disclosure.

FIG. 23 is a flowchart illustrating exemplary operation of the beamforming unit shown in the example of FIG. 22 in implementing the techniques described in this disclosure. As shown in FIG. 23, beamforming unit 250 may initially receive RF signals via antennas 254 (270). LNA units 256 may amplify potentially weak aspects of the received RF signals (272). I/Q mixers 259 may mix the RF signals from antennas 254 and the I and Q channel LO signals from QILO unit 258 to produce IF signals and may output the IF signals to AAF units 260 (274). AAF units 260 may then perform anti-aliasing to restrict bandwidth of a signal or, in other words, select one or more channels or ranges of the signal received from I/Q mixers 259 and may transmit the anti-aliased IF signals to CRAFT units 262 (276). CRAFT units 262 may transform this analog input signal to generate a transformed analog signal (278). In some examples, CRAFT units 262 may perform an FFT to transform the analog input signal to generate an FFT transformed analog output signal, acting as a frequency discriminator unit. In some examples, CRAFT units 262 may perform spectral filtering of the received IF signal. For example, if CRAFT units 262 are N-point FFTs, CRAFT units 262 may slice a frequency into N frequency slices.

CRAFT units 262 may represent a passive analog multi-stage charge re-use linear transform circuit in that CRAFT units 262 do not require active components to convert voltage values to charge values in-between two or more passive charge re-use stages but instead utilize what may be referred to as "passive" switching to switch charge values from one stage to another stage. Moreover, application of a FFT constitutes one type of linear transform and, thus, CRAFT units 262 may represent a linear transform circuit. CRAFT units 262 may output the transformed analog output signal to vector combiners 264. Vector combiners 264 may perform phase shifting and spatial filtering on the narrowband frequency slices outputted by CRAFT units 262 (280). Vector combiners 264 may output the filtered signals to ADC units 266, which may convert the transformed analog signals to digital signals for use by DSP unit 268 (282). DSP unit 24 may process the digital signals (284) on using one or more of the signal processing algorithms described above.

Figure 24A:
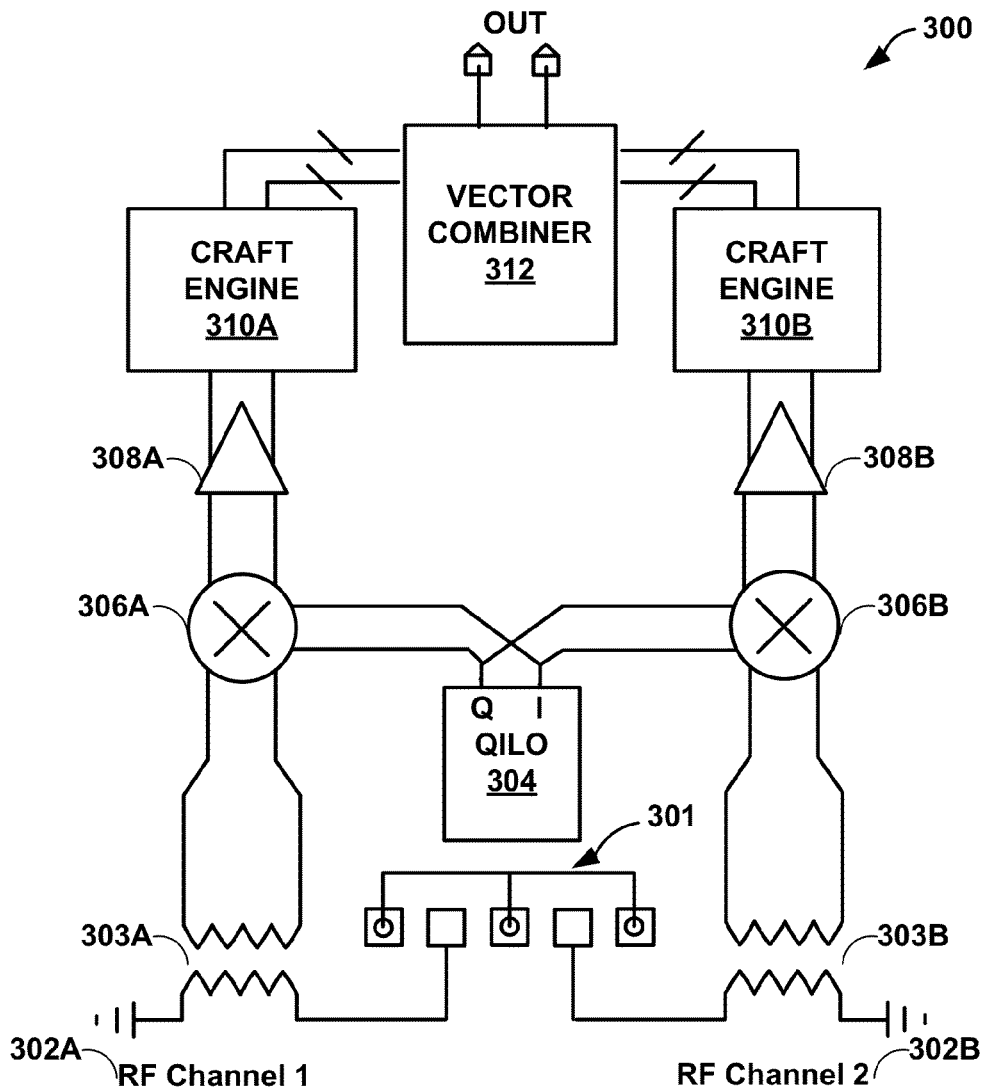
FIG. 24A is a block diagram illustrating a prototype beamforming receiver according to some aspects of the present disclosure.

FIG. 24A is a block diagram illustrating a prototype beamforming receiver 300 according to some aspects of the present disclosure. As shown in FIG. 24A, beamforming receiver 300 may represent a proof of concept two-channel four-frequency 8 GHz beamforming receiver implemented in a 65 nm CMOS semiconductor. RF channels 302A and 302B may receive single-ended RF inputs centered around 8 GHz through a GSGSG probe 301. On-chip baluns 303A and 303B may convert the single-ended signals received by RF channels 302A and 302B to differential signals. Baluns 303A and 303B may each drive quadrature mixers 306A and 306B, respectively. Quadrature mixers 306A and 306B may also receive I and Q channel LO signals generated by quadrature injection locked oscillator (QILO) 304. IF amps 308A and 308B may amplify the buffered I and Q outputs from quadrature mixers 306A and 306B, respectively, and may feed the amplified buffered I and Q outputs to CRAFT engines 310A and 310B, respectively. Beamforming receiver 300 may include a CRAFT engine for each channel. Discrete time outputs from CRAFT engines 310A and 310B may be fed to vector-combiner 312 to complete the beam synthesis.

Figure 24B:
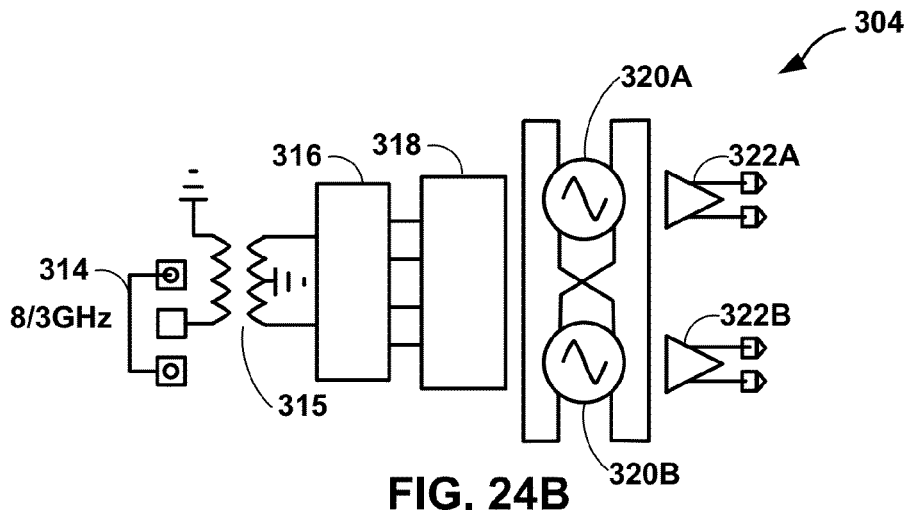
FIG. 24B is a block diagram illustrating the quadrature injection locked oscillator of the beamforming receiver show in FIG. 24A, according to some aspects of the present disclosure.

FIG. 24B is a block diagram illustrating the quadrature injection locked oscillator 304 of the beamforming receiver 300 shown in FIG. 24A, according to some aspects of the present disclosure. As shown in FIG. 24B, QILO 304 may perform frequency multiplication as well as quadrature enhancement. A GSG probe 314 may provide a single-ended injection signal with a frequency of $$\frac{f_{LO}}{3},$$

where $f_{LO}$ is 8 UHz in the example of FIG. 24B. On-chip balun 315 may convert the injection signal to a differential signal. The differential outputs of balun 315 are fed to poly-phase filter 316. Poly-phase filter 316 converts the differential outputs to I-Q differential signals. Pulse slimmer 318 hard limits and pulse slims these quadrature signals to reduce the content of the fundamental and to enhance the $3^{rd}$ harmonic of the injection signal. Voltage-controlled oscillators (VCOs) 320A and 320B may have 3-bit capacitor banks that tune the VCOs' frequency from 7.95 GHz to 9.2 GHz. VCOs 320A and 320B may draw currents of 5.6 mA from a 1.2V power supply. Current mode logic buffers (322A and 322B) that draw a combined current of 10 mA from a 1.2V supply may buffer the outputs of VCOs 320A and 320B.

Figure 24C:
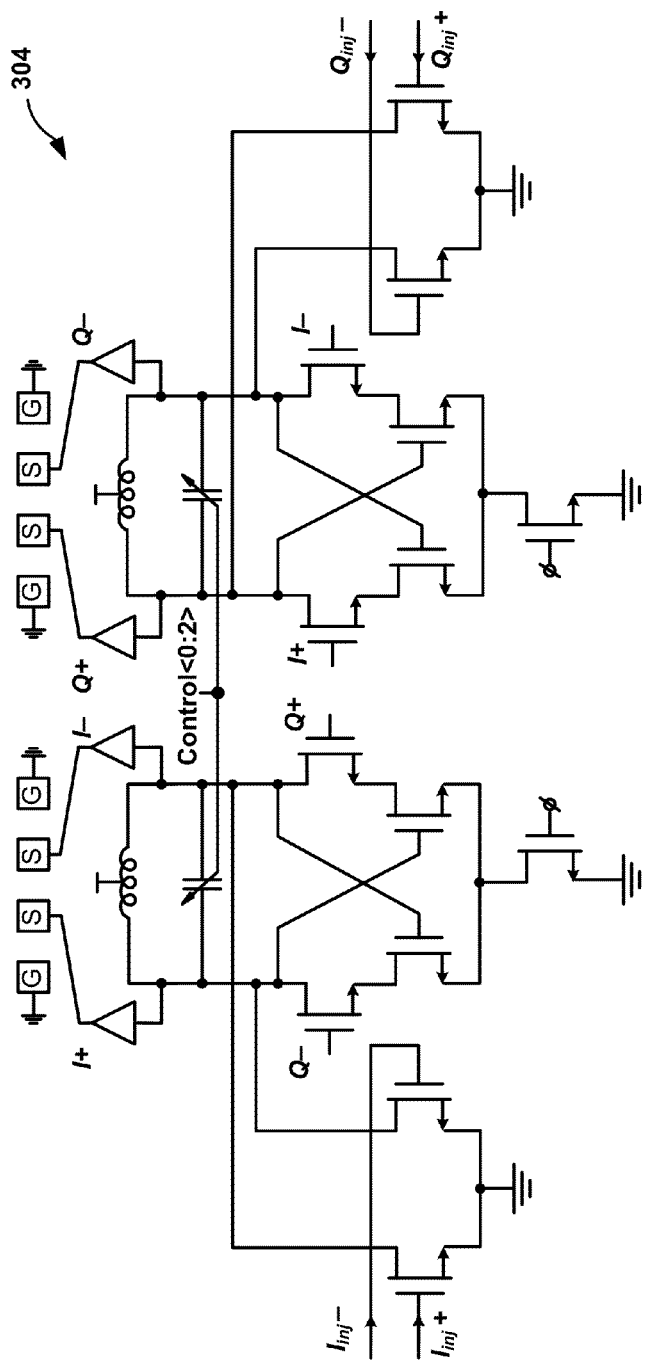
FIG. 24C is a circuit diagram illustrating the quadrature injection locked oscillator shown in FIGS. 24A and 24B.
Figure 24E:
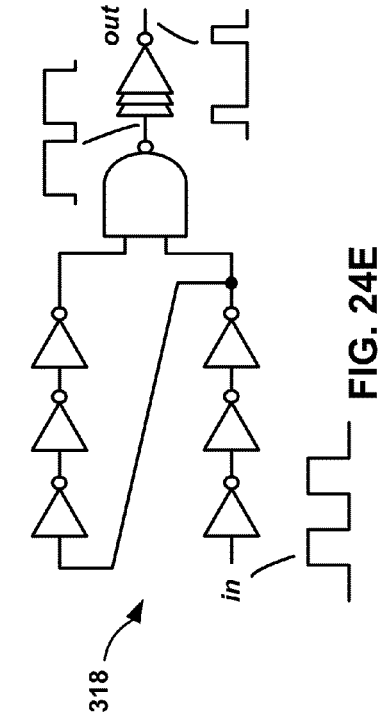
FIG. 24E is a circuit diagram illustrating the pulse slimmer 318 of the quadrature injection locked oscillator shown in FIG. 24B.
Figure 24D:
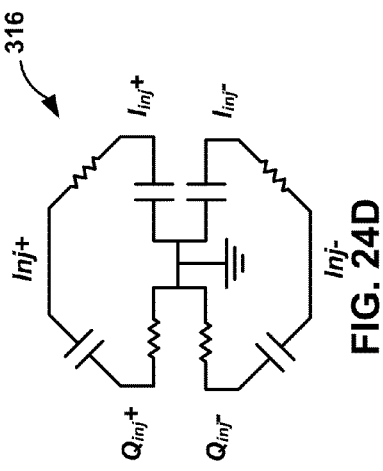
FIG. 24D is a circuit diagram illustrating the poly-phase filter of the quadrature injection locked oscillator shown in FIG. 24B.
Figure 24F:
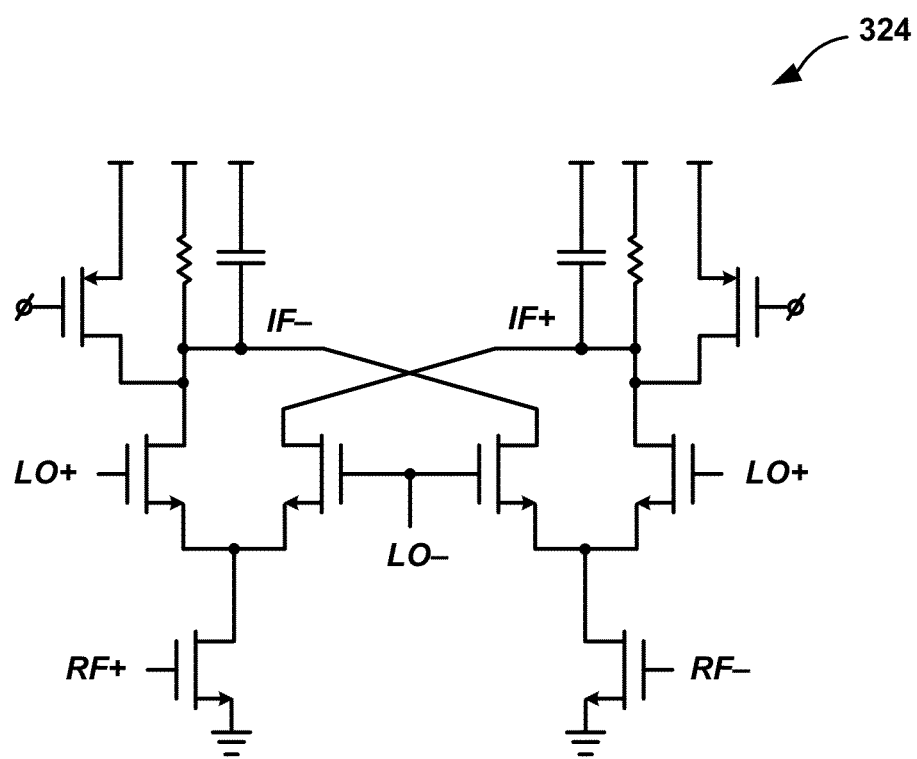
FIG. 24F is a circuit diagram illustrating an IQ downconversion mixer.

FIG. 24C is a circuit diagram illustrating the quadrature injection locked oscillator 304 shown in FIGS. 24A and 24B. FIG. 24D is a circuit diagram illustrating the poly-phase filter 316 of the quadrature injection locked oscillator shown in FIG. 24B. FIG. 24E is a circuit diagram illustrating the pulse slimmer 318 of the quadrature injection locked oscillator shown in FIG. 24B. FIG. 24F is a circuit diagram illustrating an IQ downconversion mixer. As shown in FIG. 24F, downconversion mixer 324 may be quadrature mixers 306A and 306B of beamforming receiver 300 shown in FIG. 24A.

CRAFT engines 310A and 310B ("CRAFT engine 310") shown in FIG. 24A may each be a passive-switched capacitor analog domain charge-sharing FFT engine like CRAFT unit 12 shown in FIG. 1. Craft engine 310 may be based on the recursive Cooley-Tukey radix-2 FFT algorithm for discrete Fourier transform computation that recursively re-expresses the discrete Fourier transform of an arbitrary composite size $N=N_1N_2$ in terms of smaller DFTs of sizes $N_1$ and $N_2$. CRAFT engine 310 may receive signal values and may sample those signal values onto capacitors as inputs. The charges stored on the capacitors can be summed, subtracted, scaled, and rotated through a sequence of charge sharing operations.

Figure 25A:
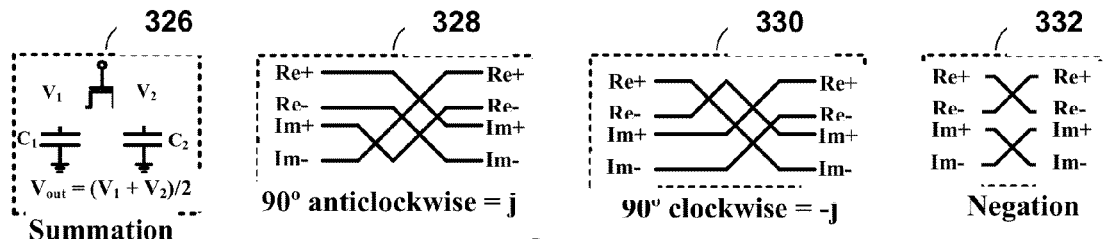
FIG. 25A is a diagram showing unit operations performed by the CRAFT engine according to some aspects of the present disclosure.

Because the inputs to CRAFT engine 310 are generally complex, beamforming device 300 may maintain separate I and Q data streams to represent complex values. FIG. 25A is a diagram showing unit operations performed by the CRAFT engine according to some aspects of the present disclosure. As shown in FIG. 25A, the charges on the capacitors $C_1$ and $C_2$ can be shared in the same order of polarity to achieve summation operation 326, $v_1+v_2$. The subtraction operation (not shown) is identical to the summation operation 326 except that the polarity of one of the charges is reversed. CRAFT engine may also perform negation operation 332. For a scaling operation (not shown), the charge on a capacitor is shared with a capacitor with no charge. Rotation or complex multiplication, such as the 90° anticlockwise operation 328 or the 90° clockwise operation 330, may be a two-step operation. For example, to compute $(x_i+jx_q)(\alpha+j\beta)$, CRAFT engine 310 may first compute $\alpha x_i$, $\alpha x_q$, $\beta x_i$, and $\beta x_q$. CRAFT engine 310 may sum the results of the first computation to result in $\alpha x_i - \beta x_q$ and $\alpha x_q + \beta x_i$. In this scheme, sub-unity scaling may be performed, where the scaling coefficient is $e^{j\theta}$ whose real and imaginary parts are $\cos(\theta)$ and $\sin(\theta)$, ≤1.

Figure 25B:
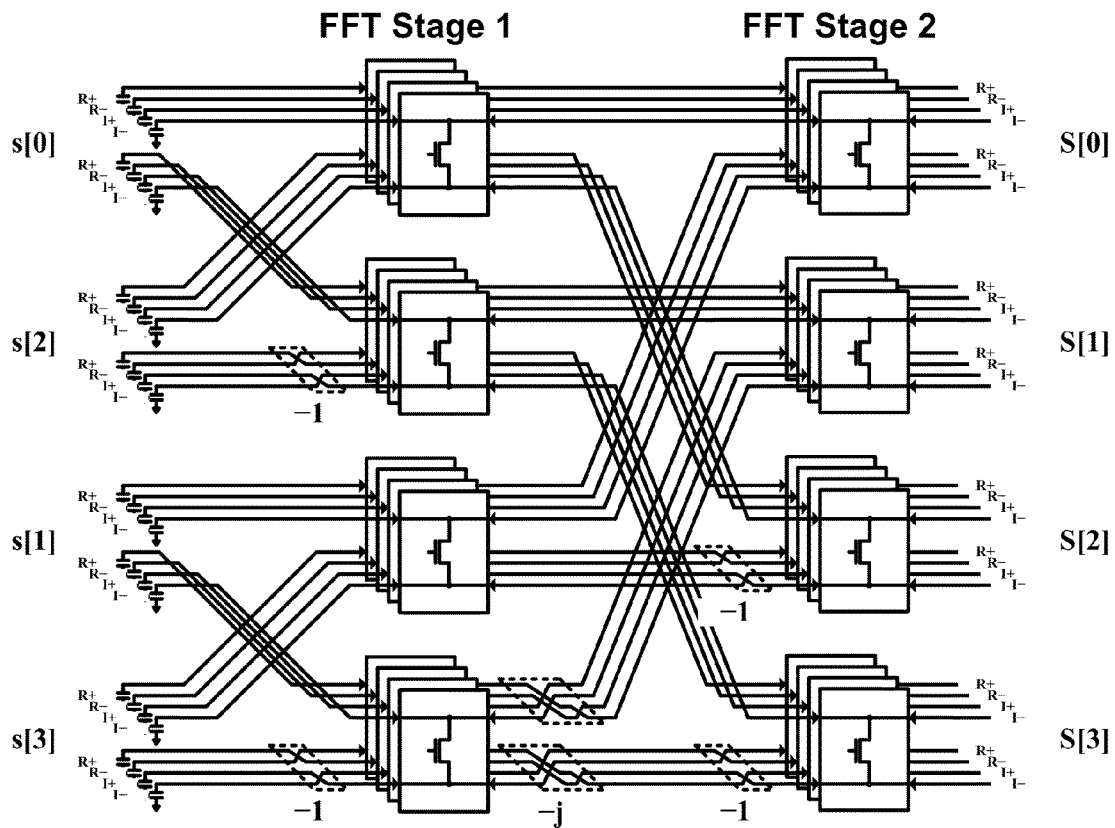
FIG. 25B is a block diagram illustrating the CRAFT engine's radix operations according to some aspects of the present disclosure.

FIG. 25B is a block diagram illustrating radix operations performed by the CRAFT engine 310 according to some aspects of the present disclosure. CRAFT engine 310 may be a 4-point FFT that uses two radix-2 stages. The four bin outputs of the 4-point FFT, in terms of inputs s[0], s[1], s[2], and s[3], can be written as the following equations (11-14)

$$S_{DC}=(s[0]+s[1]+s[2]+s[3]) \quad (11)$$

$$S_{fs/4}=(s[0]-s[2])-j(s[1]-s[3]) \quad (12)$$

$$S_{fs/2}=(s[0]+s[1]+s[2]-s[3]) \quad (13)$$

$$S_{-fs/4}=(s[0]-s[2])+j(s[1]-s[3]) \quad (14)$$

Figure 26:
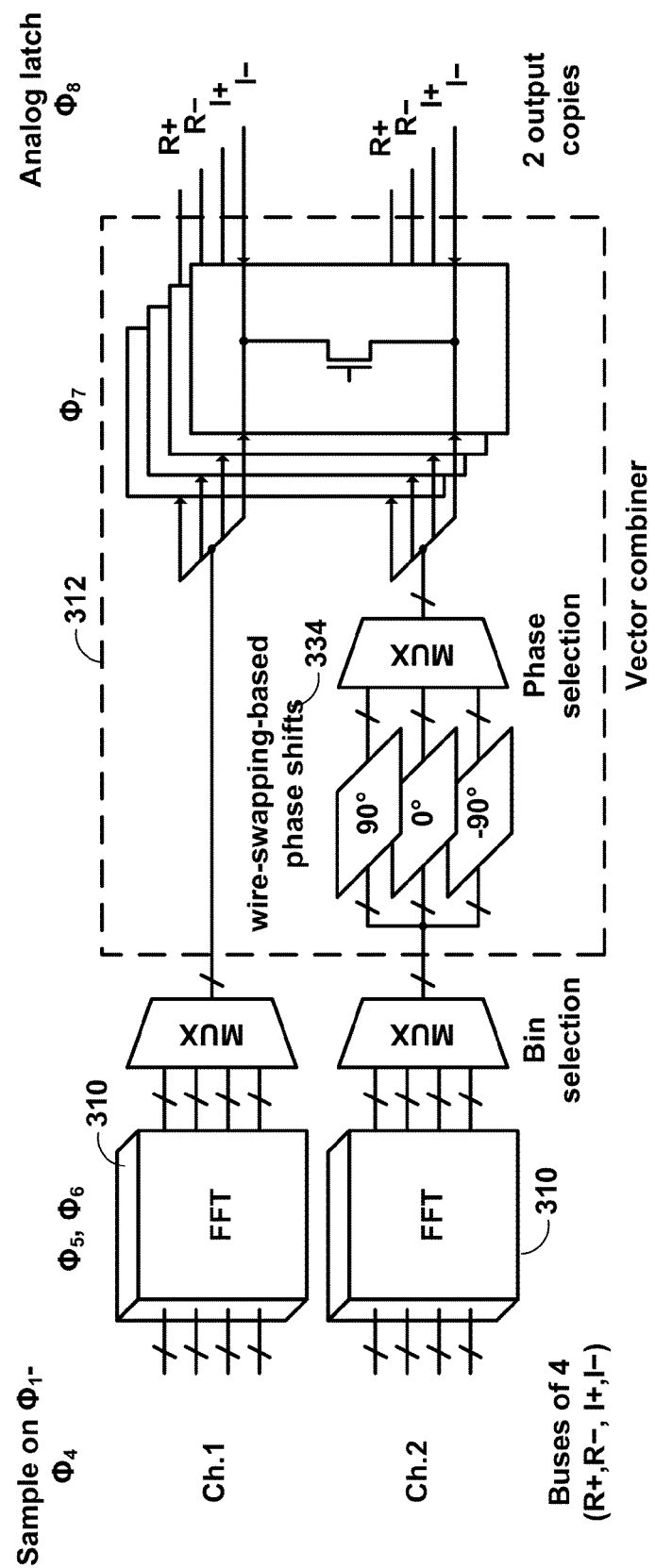
FIG. 26 is a block diagram illustrating the CRAFT engine and a vector combiner according to some aspects of the present disclosure.

FIG. 26 is a block diagram illustrating the CRAFT engine and a vector combiner according to some aspects of the present disclosure. As shown in FIG. 26, the baseband is realized through switched capacitor circuits. A state machine from an external clock input (not shown) generates a total of 8 clock phases $\phi_1$-$\phi_8$ for sampling and processing operations. The first four clock phases $\phi_1$-$\phi_4$ are used for sampling while the next two clock phases $\phi_5$-$\phi_6$ are used for processing by CRAFT engine 310. The last two clock phases are used for vector combining by vector combiner 312 and output latching.

Vector combiner 312 may include phase shifter 334 that perform three discrete phase shifts, $\theta\in\{-90, 0, 90\}$ that are realized through clockwise and anticlockwise rotations that are the same as the ones used for the charge-sharing ±1 multiplication in CRAFT engine 310. A switch in vector combiner 312 may be used to select between the three phase shifts. The phase shifts may only be applied to signals from Channel 2. One phase shift may be realized at a time. Each bin of CRAFT engine 310 may be followed by vector combiner 312 for a total of four vector combiners 312 for a 4-point FFT.

Even though phase shifter 334 can provide the same phase resolution as a 4-point FFT, only one phase shift may be realized at a time, unlike an FFT. For an N-point FFT as a phase shifter, there may be N concurrent beams with phase shift angles $$k\frac{2\pi}{N},$$

$k\in[o,N-1]$.

Vector combiner 312 may complete beam synthesis by summing phase-rotated output from Channel 2 with the outputs from Channel 1. Vector combiner 312 can perform summation similar to the summation operation 326 shown in FIG. 25A.

As discussed above, beamforming receiver 300 may be implemented in a 65 nm CMOS integrated circuit. Beamforming receiver 300 may occupy an area of 1.25 nm×0.75 nm including test pads. The RF section consumes 27.4 mW/channel including buffers while the baseband section may consume 135 μW (9 pJ/conversion).

Figure 27:
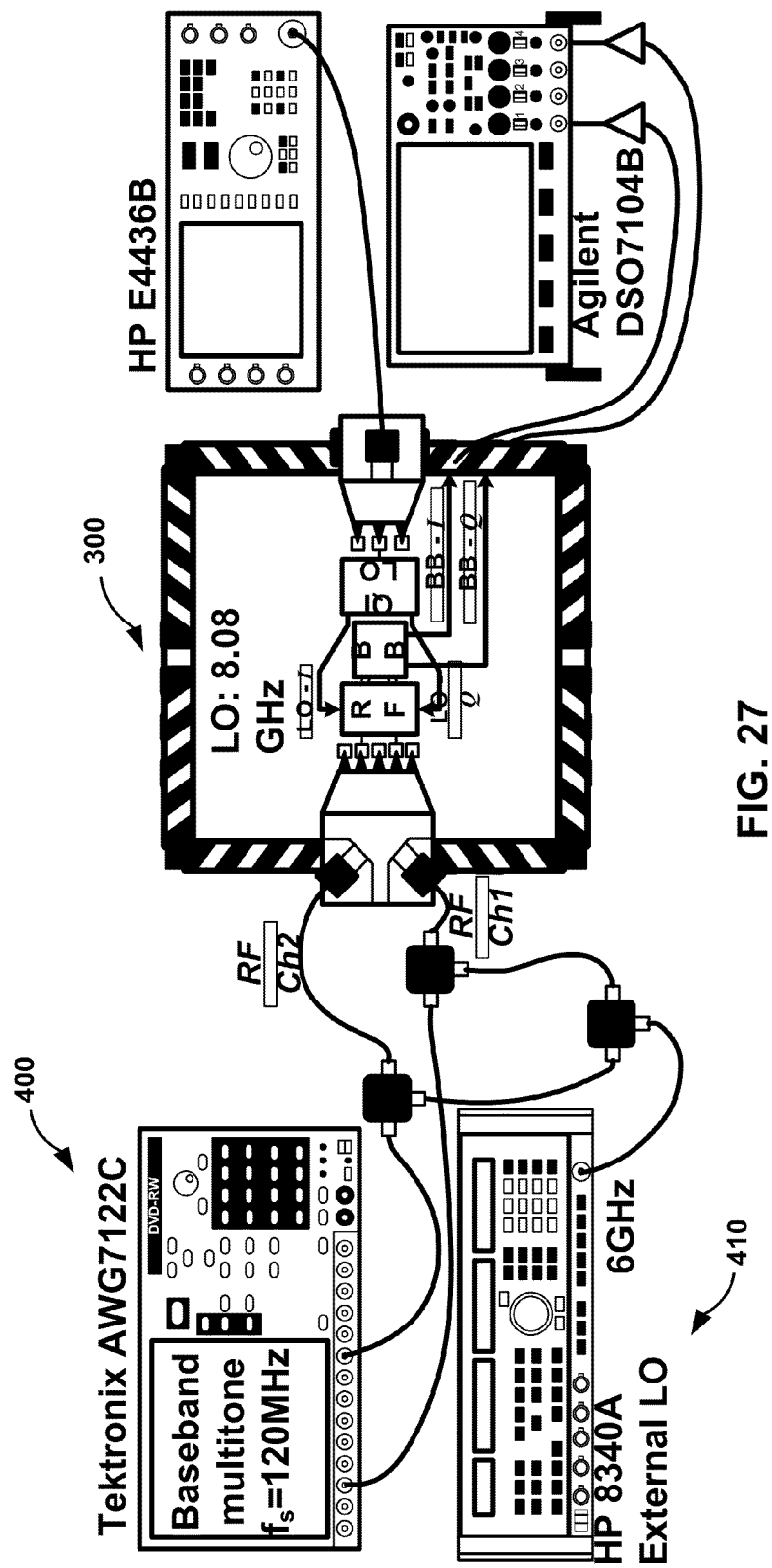
FIG. 27 is a diagram illustrating a test setup for the beamforming receiver shown in FIG. 24A according to some aspects of the present disclosure.

FIG. 27 is a diagram illustrating a test setup for the beamforming receiver shown in FIG. 24A according to some aspects of the present disclosure. As shown in FIG. 27, Arbitrary waveform generator (AWG) 400 generates IF test signals that are fed to beamforming receiver 300. The AWG's output is kept at about 2 GHz and then upconverted using an external LO 410 at 6 GHz to produce an RF input of about 8 GHz. The IF signals are generated at a high frequency (i.e., about 2 GHz) instead of baseband to avoid image signal issues. Directly upconverting a baseband signal at frequency f, would create an additional tone at −f. Thus ensuring a single tone at the sampler's input may not be possible under direct upconversion. The IF frequency (i.e., about 2 GHz) is chosen to ensure that the image frequency (i.e., about 4 GHz) falls well outside the mixer's bandwidth.

Three different types of test signals are generated: one tone, two tone, and three tones. The multi-tonal signals emulate multi-directional signals. In each case the tone is put slightly off-bin. Having an off-bin signal shows the I-Q rotation and helps to cancel any DC offset that might creep into the output magnitude calculations. Whenever a signal, for example frequency f, is sampled at a rate, for example, $f_s$, that is different from an integer multiple of the signal frequency, the sampled output is a sinusoidal signal rather than a DC value. Its frequency, also known as the beat frequency, is equal to $$\frac{f}{n_o},$$

where $$n_o = \min_i \left\{ i : i\frac{f_s}{f} \in Z \right\}.$$

Figure 28:
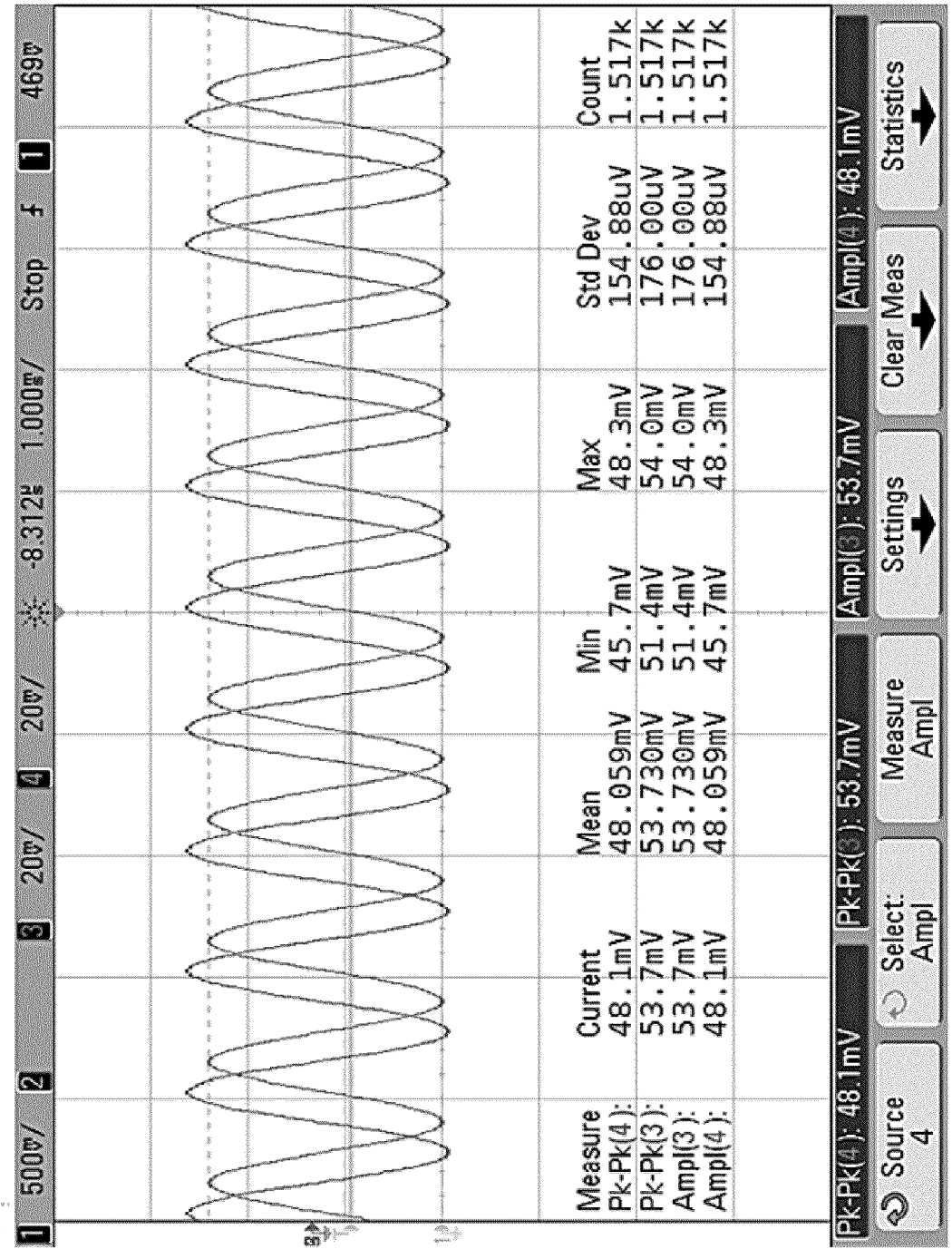
FIG. 28 shows the output on bin 2 when the beat frequency is 1 KHz according to some aspects of the present disclosure.

FIG. 28 shows the output on bin 2 when the beat frequency is 1 KHz according to some aspects of the present disclosure. Ideally, the I and Q peak-to-peak values should be the same for any off-bin signal. However, due to mismatches between the output latches and off-chip buffers, there is a minor difference in the two values.

In the test setup for the beamforming receiver 300, the analog baseband sampling rate is set to 120 MS/s and multi-carrier test signals are generated at 30 MHz intervals using the AWG at 1.989 GHz, 2.019 GHz, and 2.049 GHz (i.e., a beat frequency of 1 MHz). Output signal amplitude is calculated based on I and Q signal values $A=\sqrt{I^2+Q^2}$. This removes any offsets from the measurement. Measured average peak-to-peak values of the I and Q outputs are used in the amplitude expression. In the presence of multiple tones at the input, any non-linearity in the front-end and distortion in the FFT engine may cause unequal null depths on different frequency bins.

In the beamforming test, four different tests are performed for four different input patterns: (I) input signal on one bin (one tone), (II) input signals on two adjacent bins (two tones), (III) input signals on two alternate bins (two tones), and (IV) input signals on three bins (three tones, all but DC). FIGS. 29A-29D are diagrams illustrating output patterns of beamforming tests according to some aspects of the present disclosure. In each case, channel 1 of the beamformer is treated as the reference while the RF input to channel 2 is phase shifted in 24 uniform steps of 15° with respect to the RF input to channel 1. On-chip discrete phase shifts of 0° and ±90° are available to the signal from channel 2 while the phase of the signal from channel 1 is undisturbed.

For measurement (I), a single tone is placed on each bin, one bin at a time, and an on-chip phase shift of 0° is used. As shown in FIG. 29A, the maximum null depth observed for measurement (I) is 27 dB while the minimum null depth observed for measurement (I) is 23 dB. The excellent matching between the outputs show that beamforming post-frequency slicing can mimic, within a certain tolerance, true time delay circuits. The matching, in some examples, may be limited to local capacitor mismatch.

For measurement (II), two tones are placed on two adjacent bins. For measurement (III), two tones are placed on two alternate bins. As shown in FIG. 29B and FIG. 29C, for both measurements (II) and (III), output of one bin is phase shifted by 0° while the other is phase shifted by 90°. The maximum null depth observed for measurements (II) and (III) is 24 dB while the minimum null depth observed for measurements (II) and (III) is 19 dB.

For measurement (IV), three tones are placed in three bins with phase shifts of −90°, 0°, and +90°, respectively. As shown in FIG. 29D, the maximum null depth observed for measurement (IV) is 25 dB while the minimum null depth observed for measurement (IV) is 19 dB.

For each of the measurements, a −6 dBm RF input signal is used. Having a constant power level ensures that the maximum amplitude in time is the same across the test patterns. A high-RF power level is used in testing to compensate for the absence of an LNA in the testing setup. The sampler that precedes the CRAFT engine in the testing setup is the same as the sampler(s) used in the software defined radio front-end discussed above, such as sampler unit 21 included in FIG. 1 that could operate up to 5 GS/s. In testing, the sampling speed bottleneck was the output analog latch and the mixer bandwidth. Specifically, the output latch prevented sampling rates above 120 MS/s. However, because the latches were used only for testing and may not be part of the generic spatio-spectral beamformer architecture, the latch-based bottleneck is inconsequential. Mismatches between parasitic wiring on capacitors were expected to be the main source of error in the analog baseband. These mismatches caused linear errors in the FFT and vector-combiner, and can be easily calibrated out in the digital domain to significantly improve the null depth.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In this manner, instructions for one or more software programs or modules may be stored on a non-transitory, computer-readable storage medium. The instructions may be executed by one or more hardware-based processors or hardware-based processing units.

Various examples have been described. These and other examples are within the scope of the following claims.

What is claimed is:

1. A method comprising:
    receiving, by a passive analog circuit, an analog input signal;
    processing, by the passive analog circuit, the analog input signal in a charge domain to generate an analog output signal, including performing, by a capacitor in the passive analog circuit, one or more charge stealing operations to steal charge away from a shared output of two or more capacitors of the passive analog circuit; and
    outputting, by the passive analog circuit, the analog output signal in the charge domain.

2. The method of claim 1, wherein processing the analog input signal comprises performing one or more charge sharing operations.

3. The method of claim 1,
    wherein the passive analog circuit comprises two or more capacitors, and
    wherein the two or more capacitors of the passive analog circuit are approximately the same size.

4. The method of claim 1, wherein the first passive analog circuit does not include any components that require power from a separate power source.

5. A device comprising:
    a plurality of capacitors;
    a plurality of gates operably coupled to the plurality of capacitors; and
    wherein the plurality of capacitors and the plurality of gates are configured to perform one or more operations in a charge domain to process an analog input signal to generate an analog output signal, including performing, by a capacitor of the plurality of capacitors, one or more charge stealing operations to steal charge away from a shared output of two or more capacitors of the plurality of capacitors.

6. The device of claim 5, wherein performing the one or more operations comprises performing a charge sharing operation between at least two of the plurality of capacitors.

7. The device of claim 5, wherein each of the plurality of capacitors are approximately a same size.

8. The device of claim 5, wherein the analog output signal is outputted by the device in the charge domain.

9. The device of claim 5, wherein the device does not include any components that require power from a separate power source.

10. A device comprising:
    means for receiving an analog input signal;
    means for processing the analog input signal in a charge domain to generate an analog output signal, including means for performing, one or more charge stealing operations to steal charge away from a shared output of two or more capacitors; and
    means for outputting the analog output signal in the charge domain.

11. The device of claim 10, wherein means for processing the analog input signal comprises means for performing one or more charge sharing operations.

12. The device of claim 10, wherein means for processing the analog input signal comprises means for performing an add and scale operation on the analog input signal in the charge domain to generate the analog output signal.

13. The device of claim 10,
    wherein means for processing the analog input signal comprises means for processing the analog input signal to implement at least a portion of a discrete Fourier transform (DFT).

14. A method comprising:
    receiving, by a passive analog circuit, an analog input signal;
    processing, by the passive analog circuit, the analog input signal in a charge domain to generate an analog output signal; and
    outputting, by the passive analog circuit, the analog output signal in the charge domain such that a second passive analog circuit is able to directly operate on the analog output signal in the charge domain without having to convert the analog output signal from a voltage domain to the charge domain, wherein the passive analog circuit is a first passive analog circuit.

15. A method comprising:
    receiving, by a passive analog circuit, an analog input signal, wherein the passive analog circuit is included within a charge re-use analog Fourier transform (CRAFT) circuit;
    processing, by the passive analog circuit, the analog input signal in a charge domain to generate an analog output signal, including processing the analog input signal to implement at least a portion of a discrete Fourier transform (DFT); and
    outputting, by the passive analog circuit, the analog output signal in the charge domain.

16. The method of claim 15,
    wherein the CRAFT circuit comprises a CRAFT front-end circuit that receives the analog input signal and outputs a transformed analog output signal, and
    wherein the CRAFT front-end circuit is included within a software defined radio (SDR) device.

17. The method of claim 15,
    wherein the CRAFT circuit comprises a CRAFT front-end circuit that receives the analog input signal and outputs a transformed analog output signal, and
    wherein the CRAFT front-end circuit is included within a beamformer device.

18. The method of claim 17,
    wherein receiving the analog input signal comprises receiving an analog intermediate frequency (IF) signal,
    wherein processing the analog input signal in the charge domain to generate the analog output signal comprises performing spectral filtering of the analog IF signal, and
    wherein outputting the analog output signal comprises outputting frequency slices of the analog IF signal.

19. The method of claim 18, further comprising:
    receiving, by a second passive analog circuit, the frequency slices of the analog IF signal;
    performing, by the second passive analog circuit, spectral shifting of the analog IF signal including phase shifting one or more of the frequency slices of the analog IF signal; and outputting, by the second passive analog circuit, the spectrally-shifted analog IF signal.

20. A device comprising:
a plurality of capacitors;
a plurality of gates operably coupled to the plurality of capacitors;
wherein the plurality of capacitors and the plurality of gates are configured to perform one or more operations in a charge domain to process an analog input signal to generate an analog output signal, wherein the one or more operations include one or more of: a share operation, a share and multiply operation, a negate operation, a multiply-by-j operation, a share and complex multiply operation, and a butterfly operation.

21. A device comprising:
a plurality of capacitors;
a plurality of gates operably coupled to the plurality of capacitors;
wherein the plurality of capacitors and the plurality of gates are configured to perform one or more operations in a charge domain to process an analog input signal to generate an analog output signal;
wherein the device comprises a charge re-use analog Fourier transform (CRAFT) circuit; and
wherein processing the analog input signal comprises processing the analog input signal to implement at least a portion of a discrete Fourier transform (DFT).

22. A device comprising:
a plurality of capacitors;
a plurality of gates operably coupled to the plurality of capacitors;
wherein the plurality of capacitors and the plurality of gates are configured to perform one or more operations in a charge domain to process an analog input signal to generate an analog output signal;
wherein the device comprises a linear transform circuit; and
wherein processing the analog input signal comprises processing the analog input signal to implement at least a portion of a linear transform.

23. A device comprising:
means for receiving an analog input signal;
means for processing the analog input signal in a charge domain to generate an analog output signal; and
means for outputting the analog output signal in the charge domain, including means for outputting the analog output signal in the charge domain such that a second passive analog circuit is able to directly operate on the analog output signal in the charge domain without having to convert the analog output signal from a voltage domain to the charge domain, wherein the passive analog circuit is a first passive analog circuit.

24. A device comprising:
means for receiving an analog input signal, including means for receiving an analog intermediate frequency (IF) signal;
means for processing the analog input signal in a charge domain to generate an analog output signal, including means for performing spectral filtering of the analog IF signal; and
means for outputting the analog output signal in the charge domain, including means for outputting frequency slices of the analog IF signal.

25. The device of claim 24, further comprising:
means for receiving the frequency slices of the analog IF signal;
means for performing spectral shifting of the analog IF signal including phase shifting one or more of the frequency slices of the analog IF signal; and
means for outputting the spectrally-shifted analog IF signal.

* * * * *